United States Patent [19]

Brüggemann

[11] 4,392,123
[45] Jul. 5, 1983

[54] SIGNAL-TO-NOISE IMPROVING SYSTEM

[75] Inventor: Harro Brüggemann, Mount Waverley, Australia

[73] Assignee: The Dindima Group Pty. Ltd., Ringwood, Australia

[21] Appl. No.: 265,114

[22] Filed: May 19, 1981

[30] Foreign Application Priority Data

Jun. 2, 1980 [AU] Australia ............................. PE3840
Dec. 9, 1980 [AU] Australia ............................. PE6849
Feb. 25, 1981 [AU] Australia ............................. PE7735

[51] Int. Cl.³ ........................................... H03K 13/02
[52] U.S. Cl. ............................. 340/347 AD; 358/167; 358/36
[58] Field of Search .................... 340/347 AD, 347 C; 358/167, 36, 140; 328/165; 364/574

[56] References Cited

U.S. PATENT DOCUMENTS 3,484,591 12/1969 Trimble ............................. 364/574
3,971,891 7/1976 Wolcott ......................... 340/347 C
4,275,418 6/1981 Trump ................................. 358/167

FOREIGN PATENT DOCUMENTS 2004149 3/1979 United Kingdom ............ 340/347 C

Primary Examiner—C. D. Miller
Attorney, Agent, or Firm—Biebel, French & Nauman

[57] ABSTRACT

A signal-to-noise improving system is described which comprises a circuit input for incoming noisy analogue signals and a circuit output for digitally stored input signals which have an improved signal-to-noise ratio provided by the system and which have been reconverted to analogue form,
said circuit input and said circuit output being connected to inputs of an analogue comparator arranged to give an output which signifies that the stored signal is either higher or lower in magnitude than the incoming signal or that the incoming signal is either higher or lower in magnitude than the stored signal,
said comparator output being connected to a signal incrementor which is arranged to give a signal output which is the stored digital signal incremented higher or lower by a number digitally in response to either a higher or lower signal output from said comparator,
a store for storing in digital from the so incremented input signals, the store output being connected to a digital to analogue converter 1 the output of which is connected to said circuit output,
said comparator, said incrementor, said store and said digital to analogue converter 1 being operative cyclically to compare the incoming noisy signals with the stored analogue output signals and to up date the stored signals to new stored signals determined by adding or subtracting a number digitally from the stored signals in accordance with whether said comparator, comparing the analogue input and output signals gives a higher or lower output whereby to eventually store signals representative of the incoming signals with enhanced signal-to-noise ratio so that said circuit output can provide an output signal of those enhanced stored signals.

Preferably there is provided an incrementor controller, for controlling the incrementation of said incrementor, and wherein, in use, said incrementor initially, increments in a series of increments which are similar to those of a successive approximation analogue to digital converter whereby to provide for rapid convergence to a signal value near the mean value of the analogue input signal.

5 Claims, 23 Drawing Figures

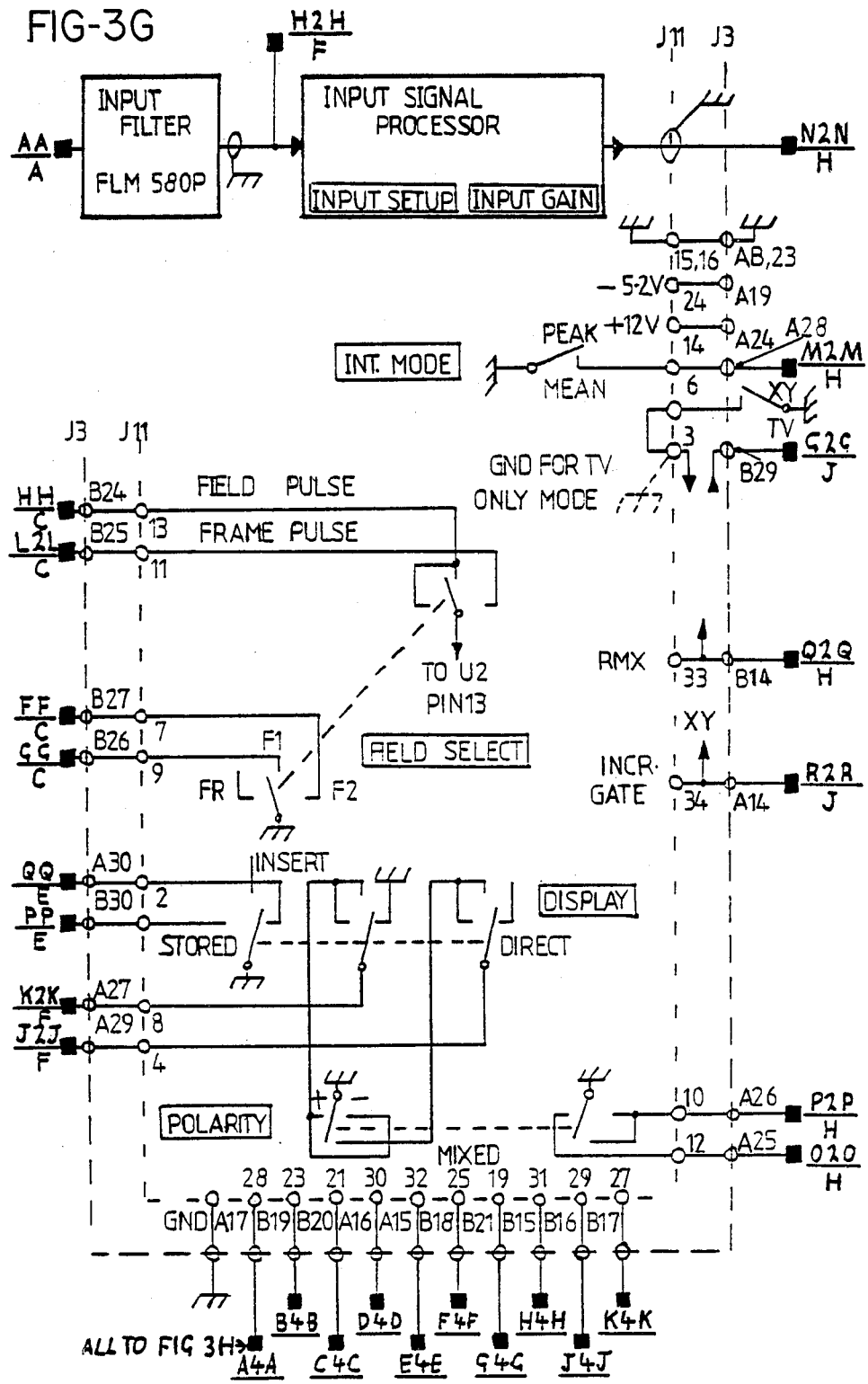

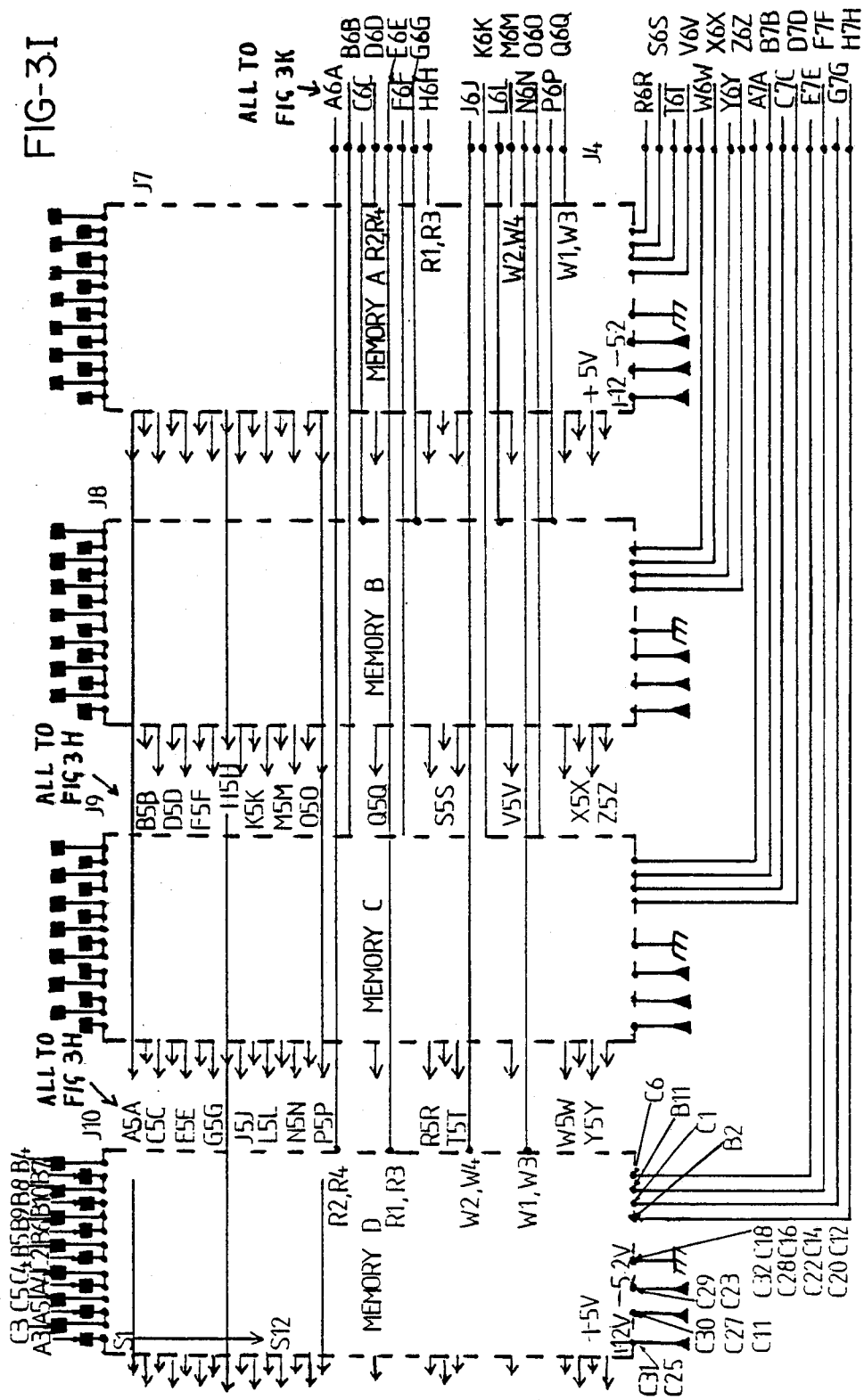

FIG-3J

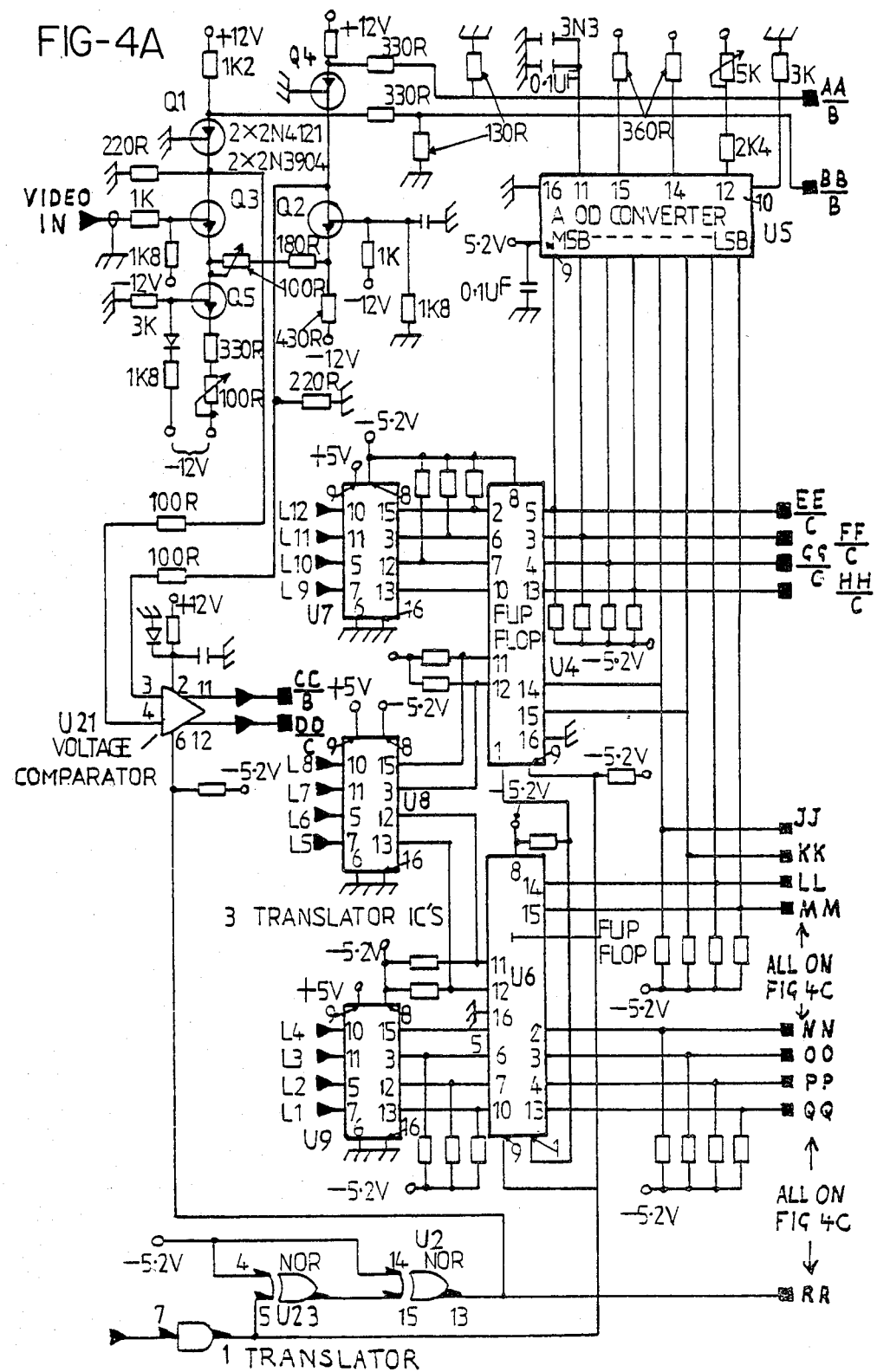

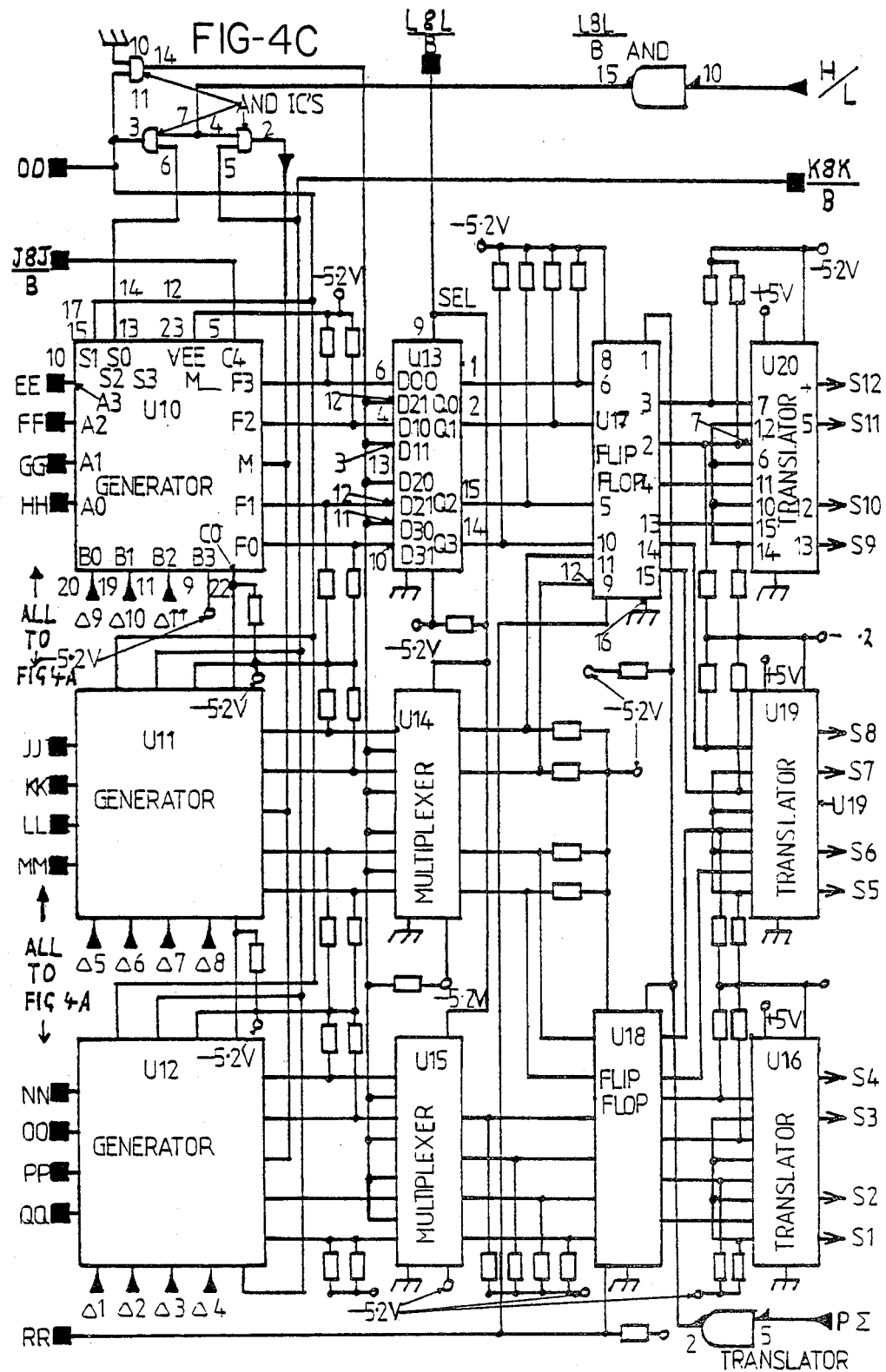

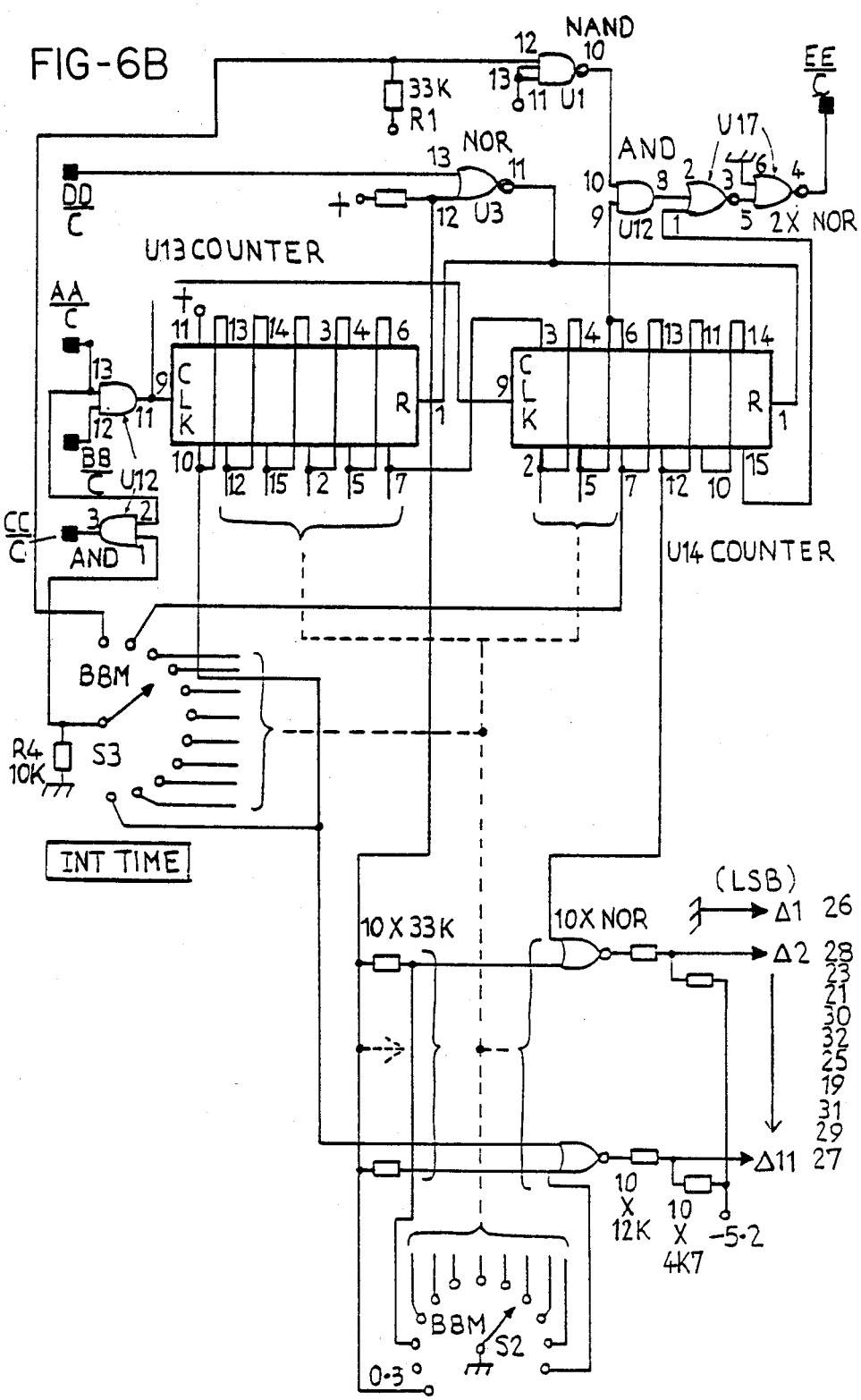

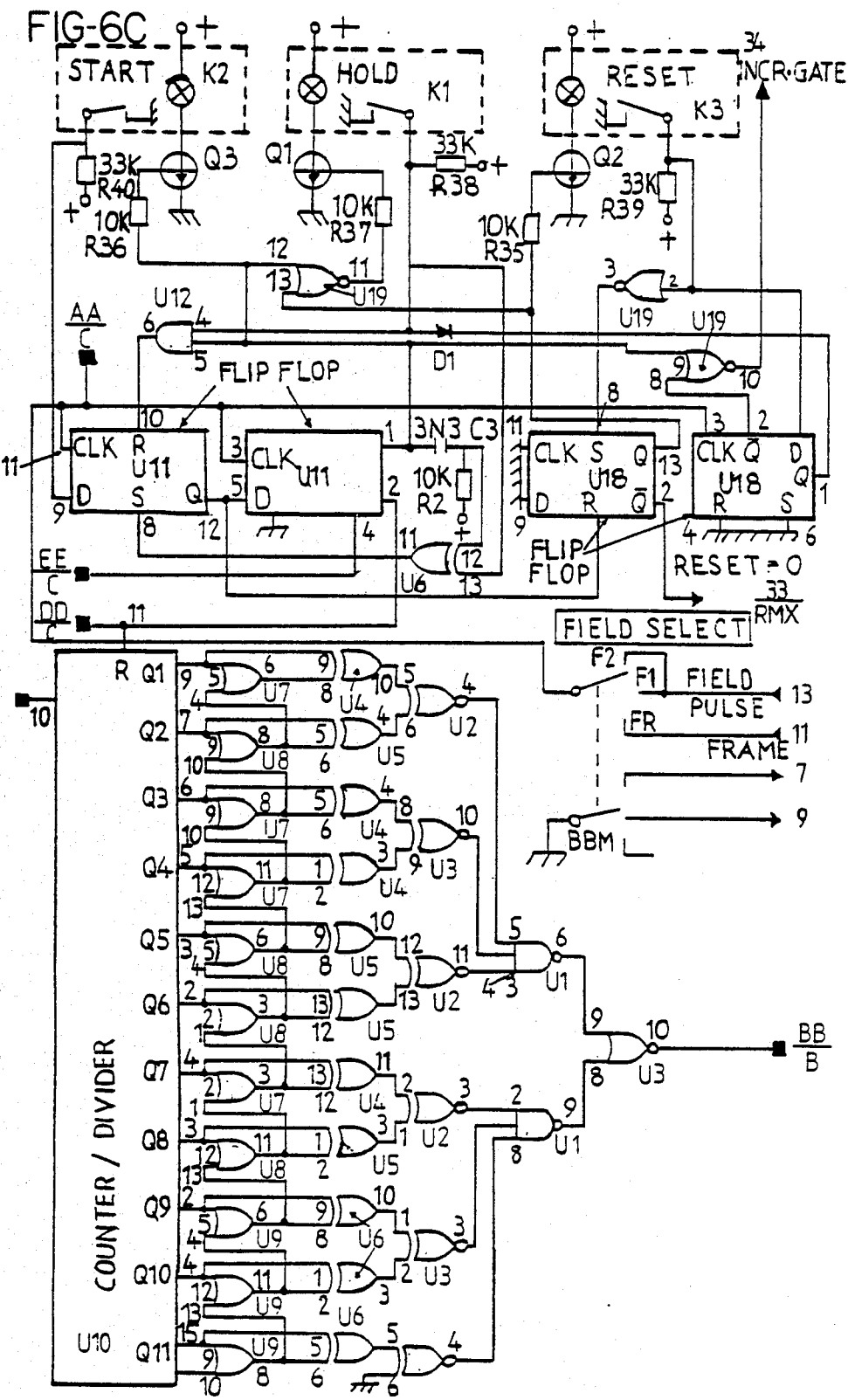

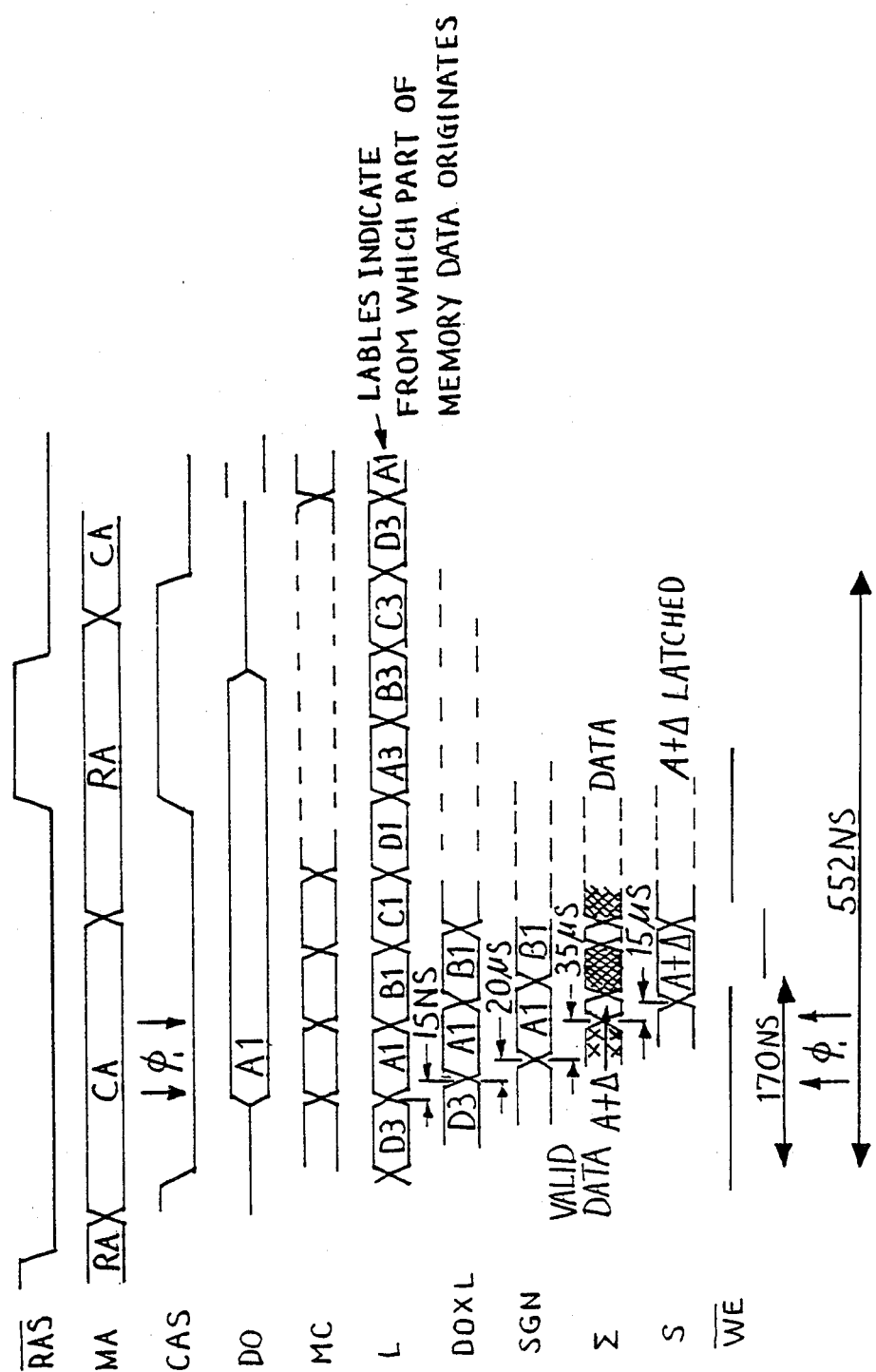

SIGNAL-TO-NOISE IMPROVING SYSTEM

BACKGROUND OF THE INVENTION

1. Field of the Invention

This invention relates to a signal store with a signal-to-noise improving system which has particular, but not exclusive application, where still picture television video frame signals are to have the signal-to-noise ratio improved. A preferred embodiment of the invention has particular application in scientific environments, wherein a video signal involving still pictures having an inherently noisy nature can be improved.

2. Description of Prior Art

In scientific applications noise has hitherto been reduced in video picture frame signals by either a summing technique involving averaging a number of T.V. frames in order to suppress non-coherent signal components. The improvment in the signal-to-noise is proportional to the square root of the total number of frames involved in the averaging process. The necessary electronic hardware used to perform this method, if a considerable signal-to-noise improvement is to be obtained, requires that the memory be large and thus the resulting cost of the equipment is generally prohibitive. For example in a system using a gray-scale resolution of 8 bits, a signal-to-noise enhancement of 40 dB would require a memory size based on at least 21 bits per picture element.

A further method of reducing the signal-to-noise ratio has been by exponential smoothing: where an exponentially weighted moving average of A frames yield an ultimate signal-to-noise ratio improvement of $\sqrt{2A}-1$ and allows a normalized image to be displayed while the signal averaging is progressing. This is referred to in "smoothing, forecasting and prediction of Discrete Time Series, by R. G. Brown, Prentice Hall, (1963) chaps. 7 and 8".

Theoretically the best result (in terms of both signal-to-noise improvement rate and ultimate value) which can be expected in any form of filtering technique is given by the summing algorithm i.e. enhancement $=\sqrt{\eta}$ where $\eta$ is the number of the frames.

For a system operating according to the summing technique it is a simple matter to calculate the memory size (i.e. bits per pixel) required to meet specific performance criteria. For example if a (voltage) enhancement factor of (say) 90 is required and the system gray-scale resolution is 8 bits then the size of the memory will be based on 21 bits per pixel and the total accumulation time (625/50 system) is approx. 6 minutes. If, in addition, a digital signal normalizer is required to produce a continuous display during the signal averaging process then the total system's hardware complexity would be considerable.

STATEMENT OF THE INVENTION

Accordingly, we have devised a system to attempt to overcome these problems.

A preferred embodiment of the invention does not use an expensive video signal analogue to digital converter and it provides a continuous normalized video output during the process. Further it achieves a (voltage) enhancement ratio equal to $\sqrt{2/\pi}\sqrt{\eta}\approx 0.8\sqrt{\eta}$ and makes more efficient use of memory in terms of the ultimate enhancement ratio per memory bit).

Therefore in accordance with one broad aspect of the present invention there may be provided a signal-to-noise improving system comprising, a circuit input for incoming noisy analogue signals and a circuit output for digitally stored input signals which have an improved signal-to-noise ratio provided by the system and which have been reconverted to analogue form, said circuit input and said circuit output being connected to inputs of an analogue comparator arranged to give an output which signifies that the stored signal is either higher or lower in magnitude than the incoming signal or that the incoming signal is either higher or lower in magnitude than the stored signal, said comparator output being connected to a signal incrementor which is arranged to give a signal output which is the stored digital signal incremented higher or lower by a number digitally in response to either a higher or lower signal output from said comparator, a store for storing in digital form the so incremented input signals, the store output being connected to a digital to analogue converted the output of which is connected to said circuit output. said comparator, said incrementor, said store and said digital to analogue converter being operative cyclically to compare the incoming noisy signals with the analogue output signals generated from the stored digital signals and to up date the stored signals to new stored signals determined by adding to or subtracting from the stored signals a digital number in accordance with whether said comparator comparing the analogue input and output signals gives a higher or lower output whereby to eventually store signals representative of the incoming signals with enhanced signal-to-noise ratio so that said circuit output can provide an output signal of those enhanced stored signals.

It is preferred that the system components are of a size digitally to process each of the picture element signals in a frame of a video picture image and wherein each of the said picture element signals is assigned with a respective N-bit digital word by said incrementor.

It is also preferred that said incrementor will, in use, increment by small levels, such that eventually the stored signal will 'hunt' about a mean value of the analogue input signal.

It is also preferred that there be an incrementor controller, for controlling the incrementation of said incrementor, and wherein, in use, said incrementor initially, increments in a series of increments which are similar to those of a successive approximation analogue to digital converter whereby to provide for rapid convergence to a signal value near the mean value of the analogue input signal.

It is also preferred that said incrementor, in use, is caused to increment initially by a value corresponding to the most significant bit and then increments successively to the least significant bit.

It is also preferred that said small level of incrementation is controllable by said incrementor controller according to a predetermined sequence based on a prior knowledge of the signal-to-noise ratio contamination such that during commencement of said small level of incrementation, the incrementation will be approximately equal to $\sqrt{2/\pi}\times$R.M.S. input noise voltage, and will be reduced to approximately $\sqrt{2/\pi}/A$ where A is the number of times the picture element is incremented.

It is also preferred that the digital number of the N-bit word is greater than the gray-scale resolution of each picture element of the frame and is also greater than the resolution of said digital to analogue converter.

It is also preferred that each of the picture elements is incremented by the same amount during that frame.

BRIEF DESCRIPTION OF THE DRAWINGS

In order that the invention can be more clearly ascertained a preferred embodiment thereof will now be described with reference to the accompanying drawings wherein:

Figure 3J:
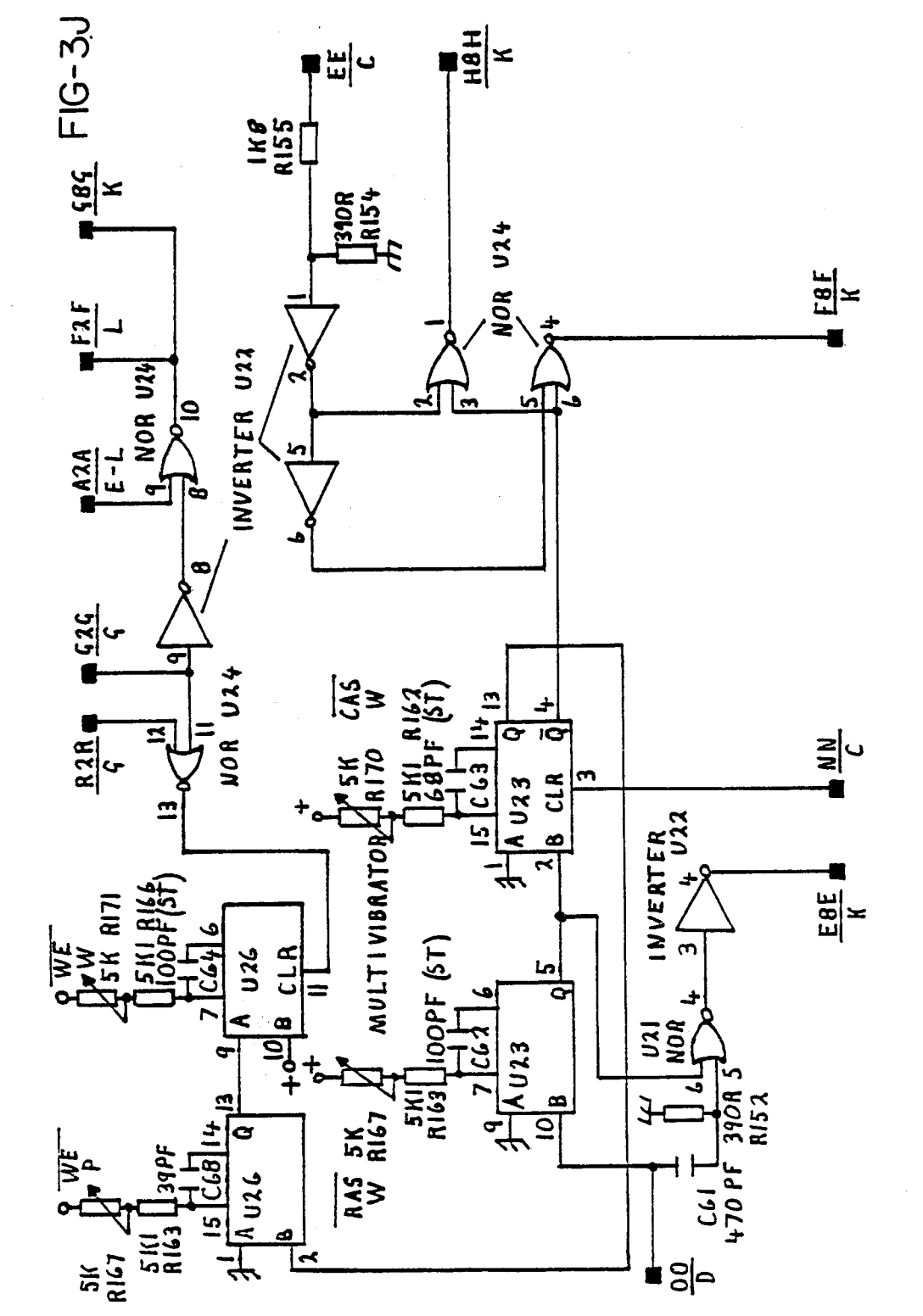

FIGS. 3A through 3L are collectively a diagram of the total circuit of the embodiment shown in FIG. 1, showing some of the sections still in block schematic form.

FIGS. 4A through 4C are collectively a diagram of the incrementor circuit of FIG. 3.

FIGS. 6A 6B & 6C are collectively a diagram of the incrementor controller circuit of FIG. 3, and FIG. 7A, is a block circuit layout of the embodiment.

DESCRIPTION OF PREFERRED EMBODIMENT

Figure 1:
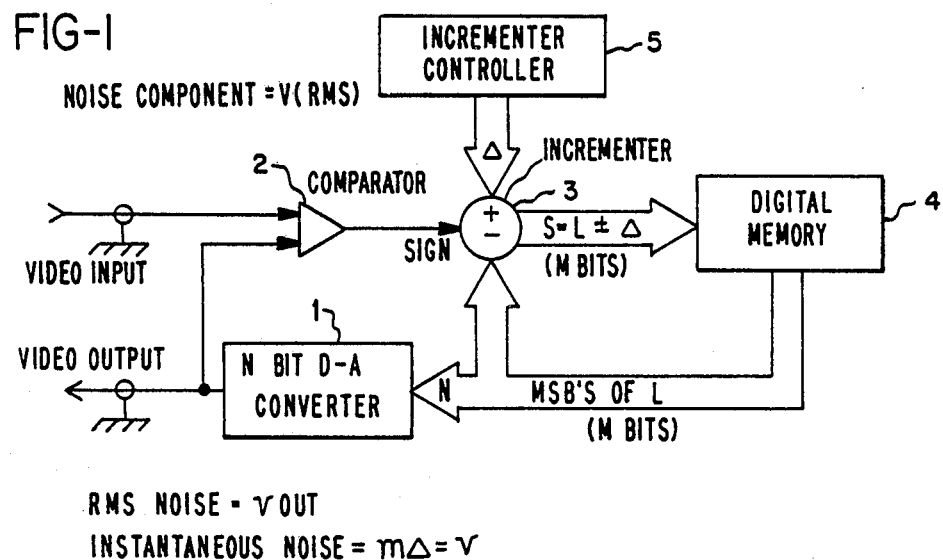
FIG. 1 is a block schematic diagram thereof used for storing and displaying still T.V. video picture signals with enhanced signal-to-noise ratio.

The preferred system includes an incrementor controller in order to accelerate the convergence of the stored signal to a substantially noise free signal.

The preferred circuit comprises (a) An N-bit digital to analogue converter 1 (b) A comparator 2 having two analogue inputs and a 1 bit (0 or 1) digital output (c) An incrementer 3 which generates the sum or difference S of two M-bit input words (L and $\Delta$) according to a binary "sign bit" input signal. It should be noted that M will always be greater than N) (d) A digital memory 4 representing the frame store and whose capacity in bits is given by M times the (total number of picture elements) and (e) An incrementor controller 5 which presets the magnitude of the incrementation $\Delta$ at the beginning of each T.V. frame according to a predetermined algorithm. The increment $\Delta$ is the same for all words in a single frame.

In use, the digital frame store 4 is read at the T.V. scan rate and the N most significant bits converted to analogue form in the analogue converter 1 to form a restored analogue output signal. This analogue output signal is also presented to one input of the comparator 2 whose other input is the incoming (noisy) T.V. video signal. In this way a sign bit of the difference between the stored picture element value and the corresponding picture value of the input signal is formed at a frame clock period for incrementing each picture element. This sign bit (SGN) is then used to determine the sense in which the stored picture element value L is updated by the increment value $\Delta$ to form (S)—the overall effect being to converge each stored picture element value digitally towards the corresponding input picture element value but with reduced noise. It should be noted that all stored picture values are updated once each frame period. During the process, in order to achieve a rapid convergence of the stored signal to a close replica of the input signal but with reduced noise, the increment size $\Delta$ can be stepped down successively after each frame period from the most significant bit—the highest number stored divided by 2. In this process each M-bit picture element cell of the frame store may be likened to the register of a successive approximation analogue to digital converter which is clocked at the frame rate. During the final stage of the process, smaller values of $\Delta$ will apply over many frame periods. It can therefore be seen that the size of word increment $\Delta$ is reduced so the influence of any random noise contaminating the input signal will be reduced. Thus any random noise contaminating the input signal will progressively have a less and less effect on the value of the stored signal. The maximum degree of noise reduction is finally obtained when the value of $\Delta$ is equal to one least significant bit of stored number in the store 4. Therefore it can be seen that the process has an effective integrating function on the value of each stored picture element. Therefore, when the value of $\Delta$ reaches a low value the stored picture element number in the store will 'hunt' about a corresponding noise free input picture element value.

Ultimately, when the desired degree of image enhancement has been achieved (for example by observing the output signal on a picture monitor) the incrementing process is terminated and the contents of the frame store frozen.

In practice for a high quality imaging system based on the 625/50 T.V. standard, a raster of (typically) 512×512 picture elements is required for the frame store and 256levels (N=8) are necessary for an accurate gray-scale rendition.

A mathematic analysis of a quantitative model of the pixel incrementing mechanism for input signals contaminated by stationary gaussian noise will now be provided. The mathematical treatment is intended to be plausible rather than rigorous, and it is to yield expressions which quantify the behaviour of the system in the engineering sense.

Referring again in FIG. 1 consider a (still) video input signal comprising a wanted signal component masked by a noise component whose RMS value is $v_{in}$. Although the real time signal sequence formed by looking along a T.V. line at spacially adjacent pixels may be a Markoff process due to band limiting or frequency weighting of the input noise signal it can confidently be said that the signal sequence formed by looking along temporally adjacent values at any particular pixel will be purely random (i.e. in all practical cases the autocorrelation function of the contaminating noise will be assumed zero for times equal to or greater than the T.V. frame period). Let $V_{out}$ (t) be the RMS value of the output (stored signal) at any time t.

For the moment let us consider the case N=M.

Two distinct phases of the convergence process for the ensemble of pixels constituting the T.V. frame will be given:

(i) Outer convergence.

This is the initial phase of the convergence process during which each pixel cell of the frame store behaves like the register of a successive approximation analogue-to-digital converter (i.e. during the first frame the value of $\Delta$ is set to the value of the most significant bit; during the second frame the value of $\Delta$ is set to the value of the 2nd most significant bit and so on). The aim of this phase is to allow the stored signal to achieve a rapid approximation to the input signal. Obviously in the absence of noise ($v_{in}=0$) the outer convergence process alone would be sufficient to give us the desired result. For $v_{in}\neq 0$ we shall assume that the value of $v_{out}$ at the completion of the outer convergence process shall be approximately equal to $v_{in}$. An accurate treatment of this phase is difficult because the initial conditions as determined by arbitrary picture content are difficult to define for the ensemble of pixels that constitute a complete T.V. frame. In practice the above approximation was found to be conservative as the typical result for a wide range of picture contents gave (empirically):

$$V_{out}(N\tau) \approx \frac{V_{in}}{2}$$

(where $\tau$ = T.V. frame period)

(ii) Inner convergence.

In this second phase of the convergence process the smaller values of $\Delta$ (culminating in $\Delta$ equal to one least significant bit) are used to allow each pixel value to approach the desired average value. The initial conditions for inner convergence shall be assumed to be:

$$V_{out} = V_{in}$$

The total time required to process a noisy T.V. signal is therefore the sum of the times taken for the outer and inner convergence processes i.e.

$$T_{total} = N\tau + T_{inner}$$

In a typical case we may be seeking a noise improvement factor of greater than 10. Also, the pixel word size will be typically between 6 and 12. We know that the shortest total convergence time will be greater than that given by the theoretical limit as set by the summing algorithm $\sqrt{N}$ $$T_{total} = N\tau + T_{inner} > 100\tau$$

From this it is evident that the magnitude of N dominates the total convergence time and for practical purposes we may make the approximation:

$$T_{TOTAL} \approx T_{INNER}$$

In order to characterize the inner convergence behaviour the purpose of the following analysis shall serve to establish:

(i) The algorithm giving the magnitude of $\Delta$ (as a function of time) to ensure the fastest convergence.

(ii) The enhancement ratio as a function of time using the above algorithm for $\Delta$.

(iii) The ultimate (limiting value) of enhancement ratio.

Considering, again, the behaviour at any particular pixel cell. Let V be the mean value of the input signal at that pixel (for still pictures the value of V is a constant). Let $m\Delta$ (m is an integer) be the deviation of the stored pixel value from V at time $t = n\tau$ (i.e. after n frame periods). Note that the value $\Delta$ is quantized due to its digital origin. Let $v_o$ be the stored pixel value at an arbitary time origin $n = 0$. Once each frame period a decision is made by the comparator causing the stored pixel value to be increased or decreased by the increment $\Delta$. Clearly this behaviour constitutes a Markoff process for which the probability of moving either higher or lower depends on the deviation of the output voltage from V at the time of decision i.e. on the value of $m\Delta$. For $m=0$ the probability of an up movement is equal to that of a down movement, while for $m \neq 0$ the probabilities are weighted to favour a movement towards $m=0$. More precisely, the probability of a down movment is given by $$\rho = \int_{-\infty}^{m\Delta} \frac{e^{-\frac{x^2}{2V_{in}^2}}}{\sqrt{2\pi}\, V_{in}} dx \quad (1)$$

and the probability of an upward movement is given by $$= 1 - \rho$$

We may expect that the statistical properties of $m\Delta$ are completely described by the second order conditional probability function $P_2(s\Delta/m\Delta;n\tau)$ (i.e. the probability that the pixel voltage takes on a value $m\Delta$ after n frame periods given that $m = s$ at time $n = 0$).

The RMS output noise voltage $v_{out}(t)$ is obtained by scanning an ensemble (constituting a complete T.V. frame) of such pixel voltages each satisfying these statistics $v_{out}^2(t)$ may therefore be equated with the variance of $m\Delta$.

Unfortunately we were unable to find an exact solution to this problem due to the non-linear nature of $\rho$ and . However, an approximation applicable to the particular situation enables us to find the "engineering solution" we seek.

Figure 2:
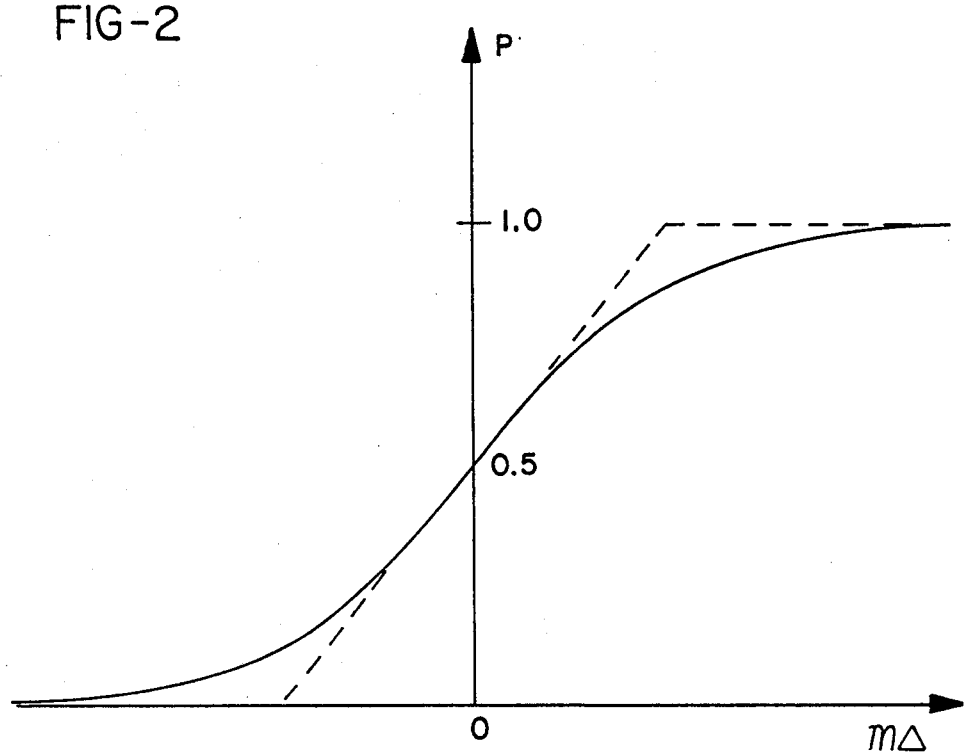
FIG. 2 is a graph showing the probability p of a downward incrementation as a function of the output voltage deviation m from the input means voltage.
Figure 3A:
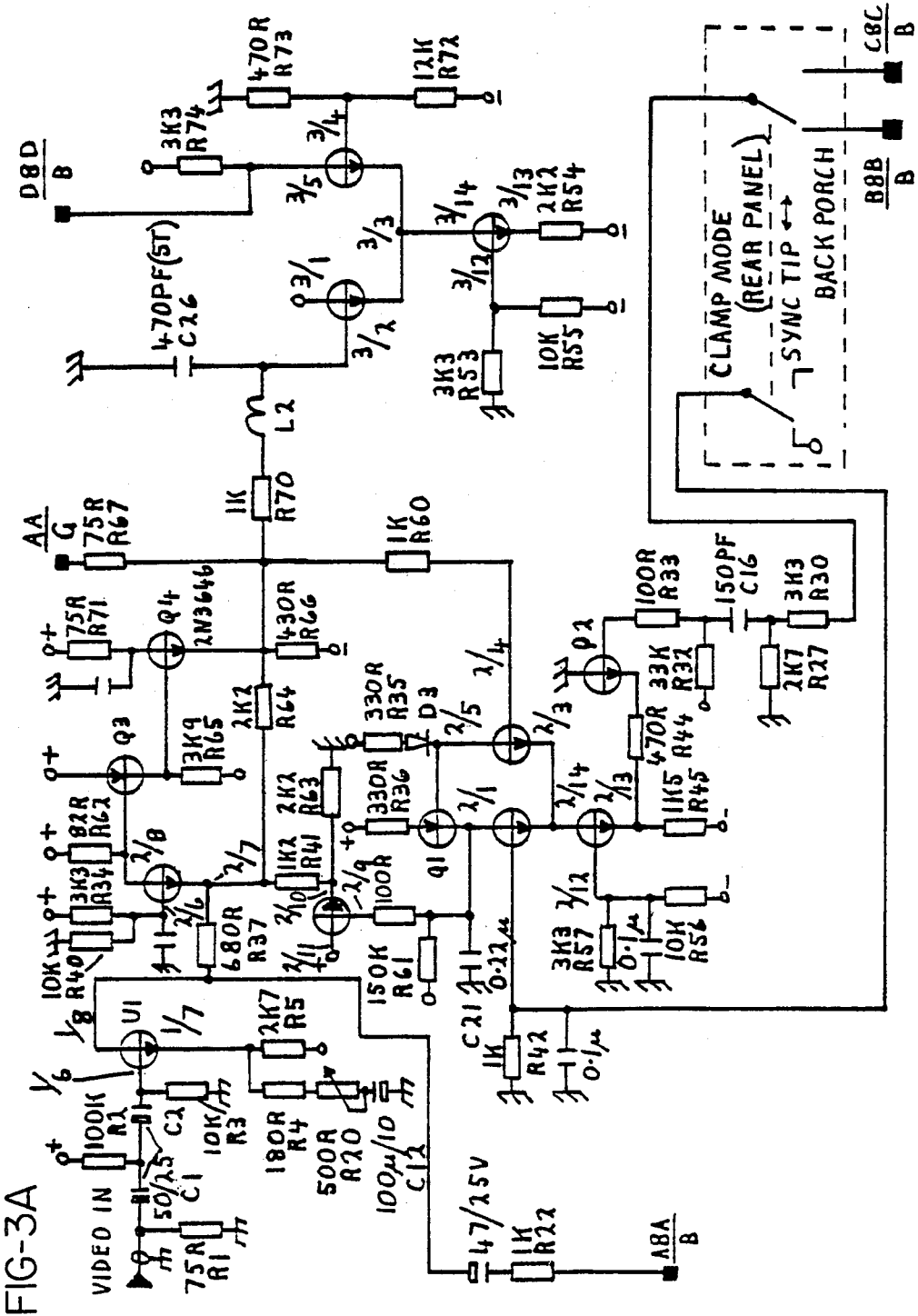
Figure 3B:
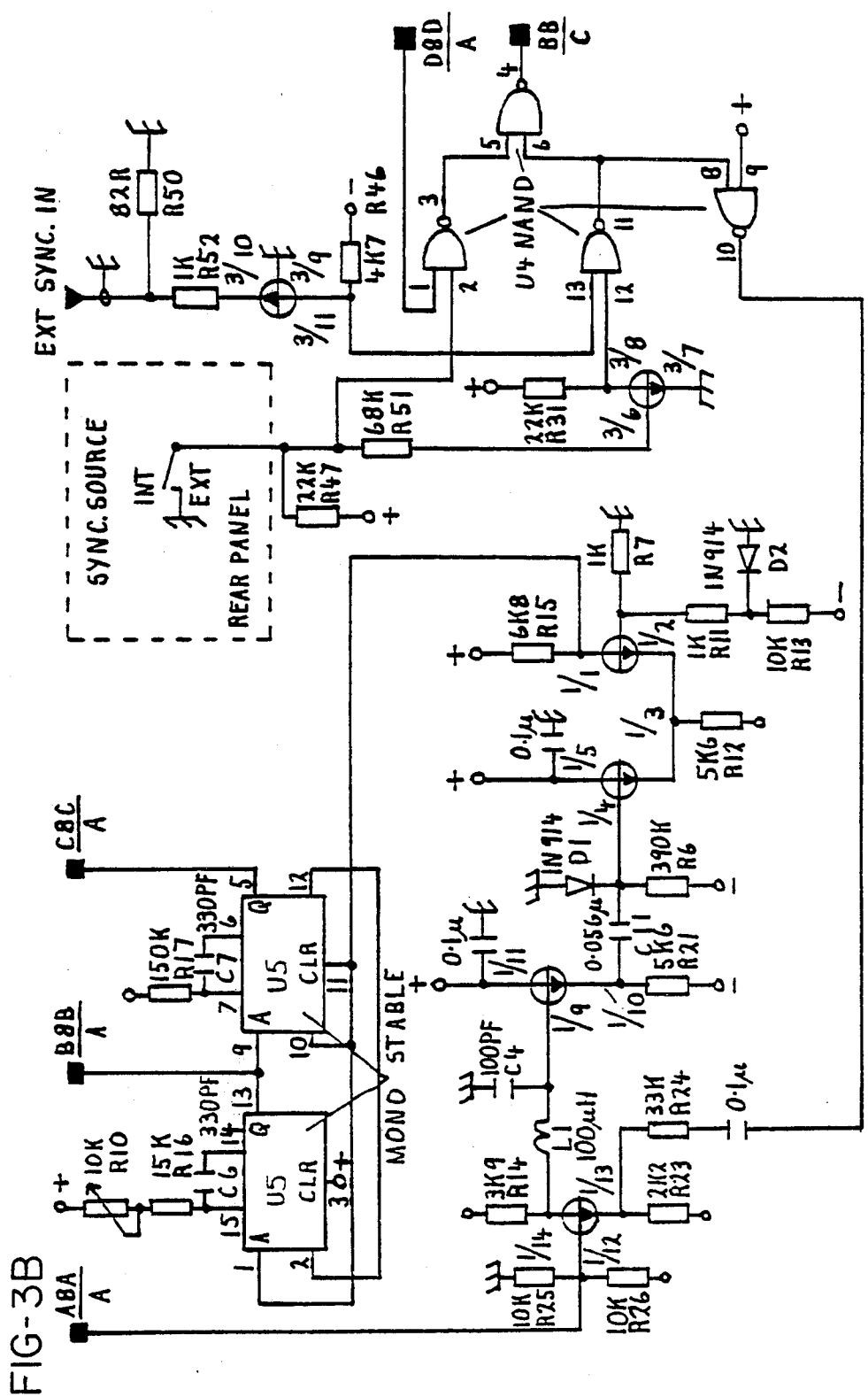
Figure 3C:
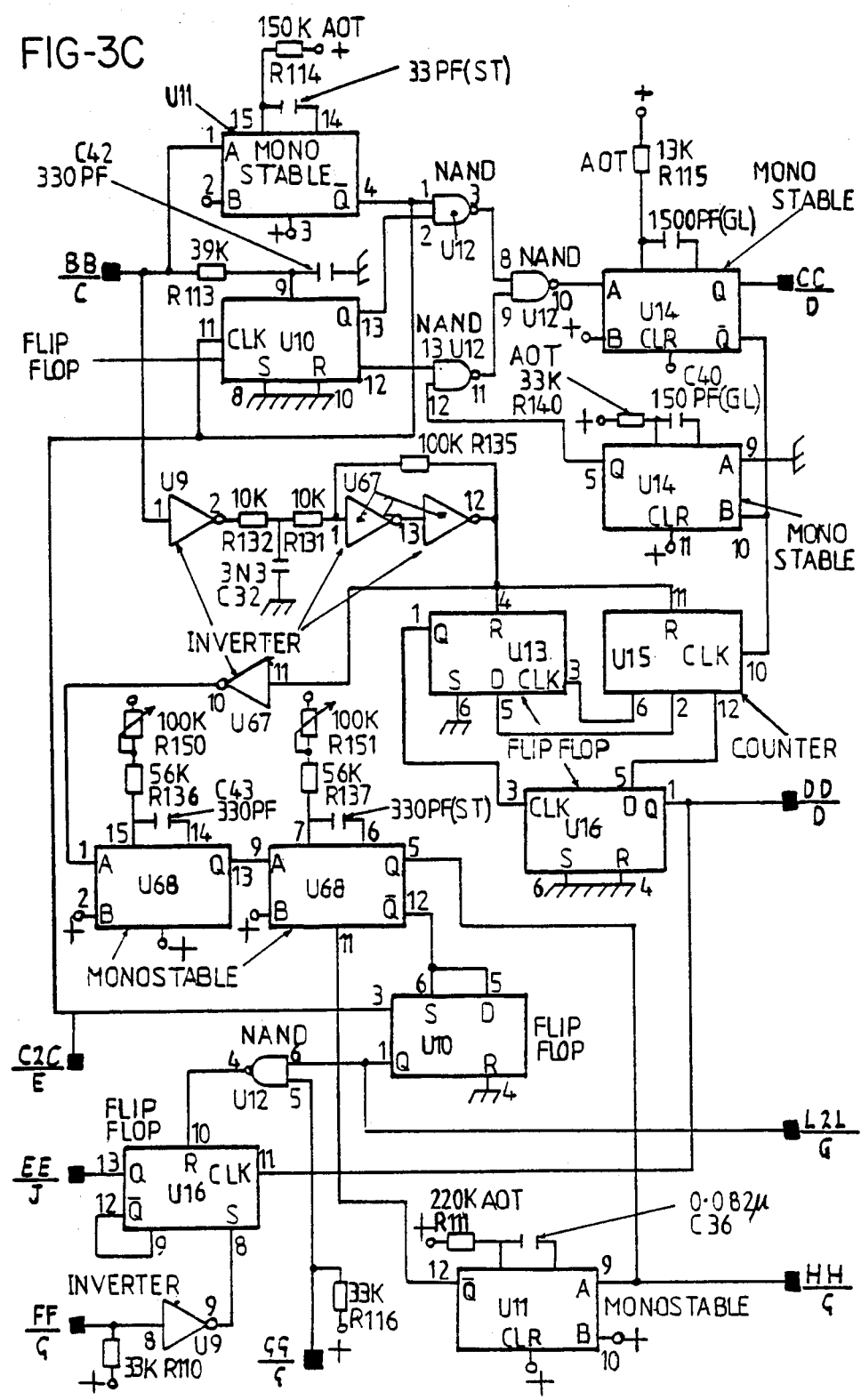
Figure 3D:
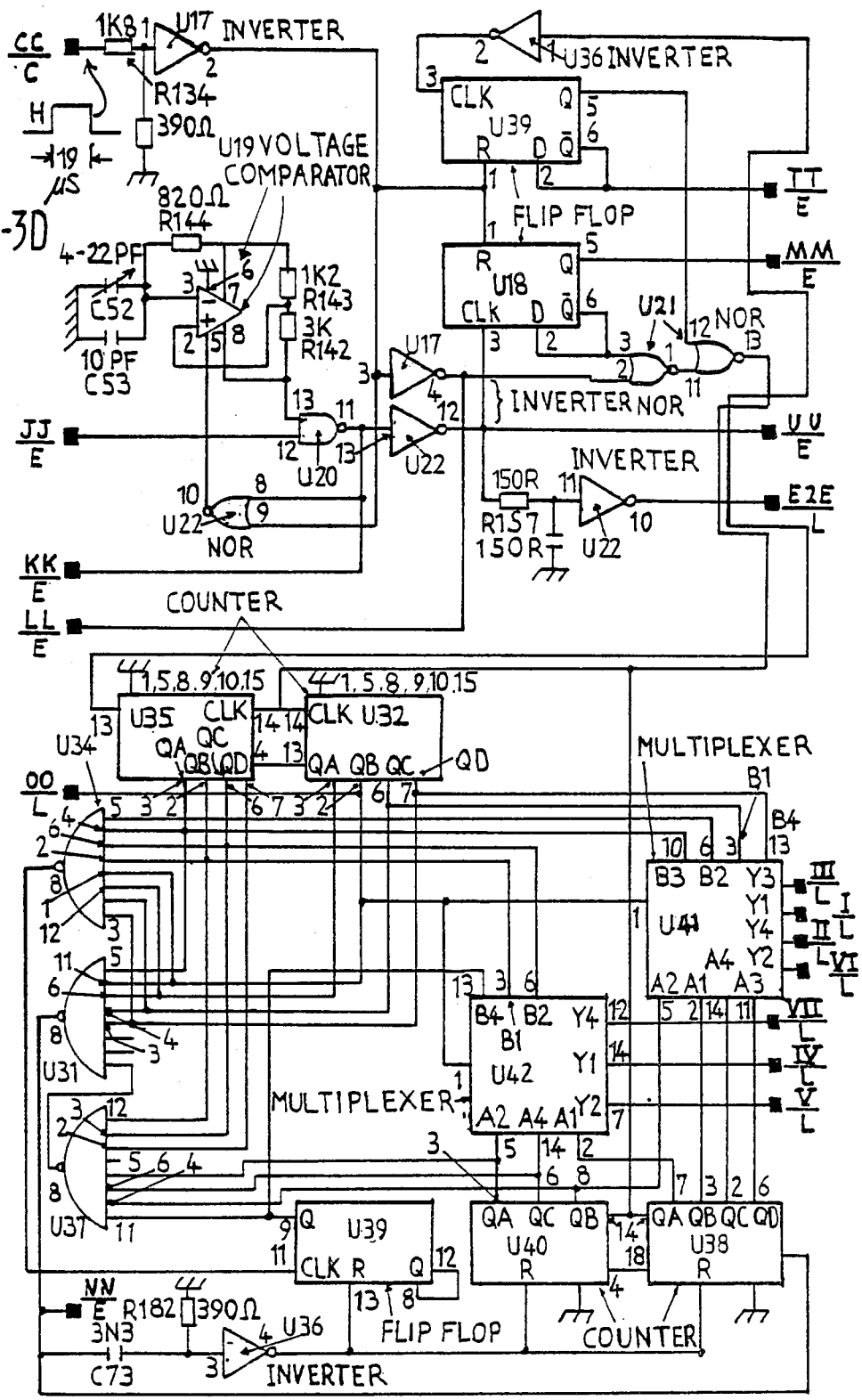
Figure 3E:
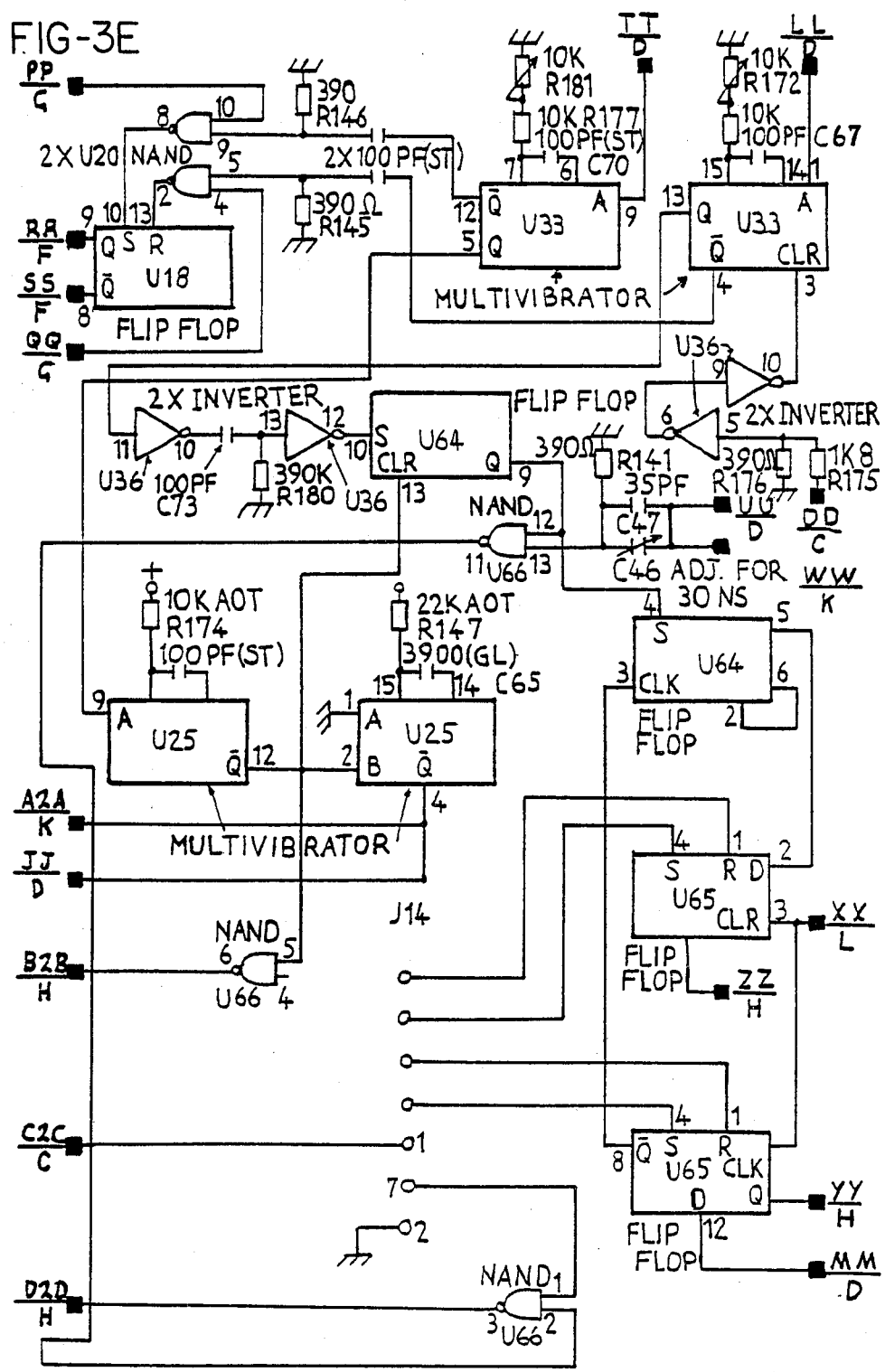
Figure 3F:
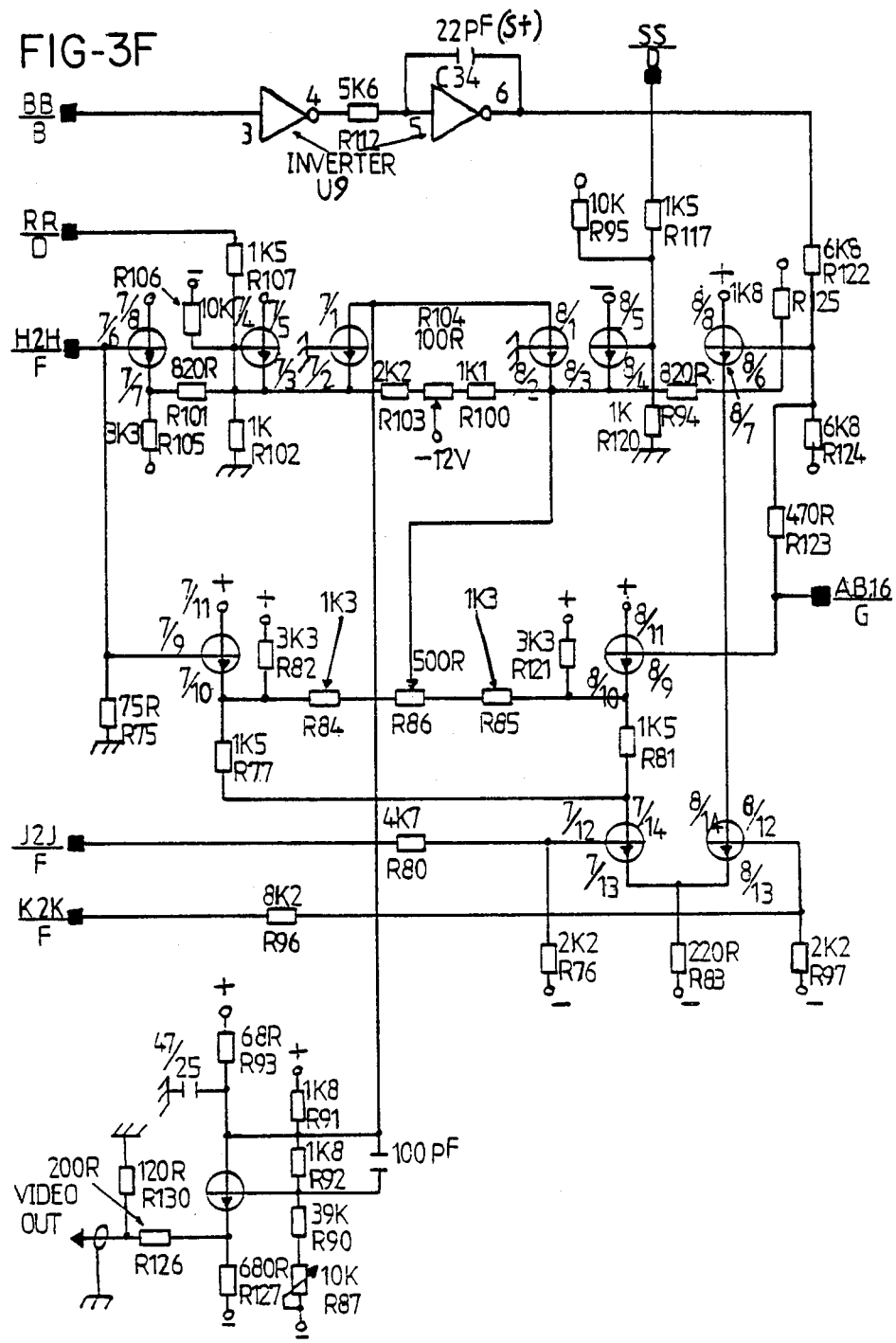
Figure 3H:
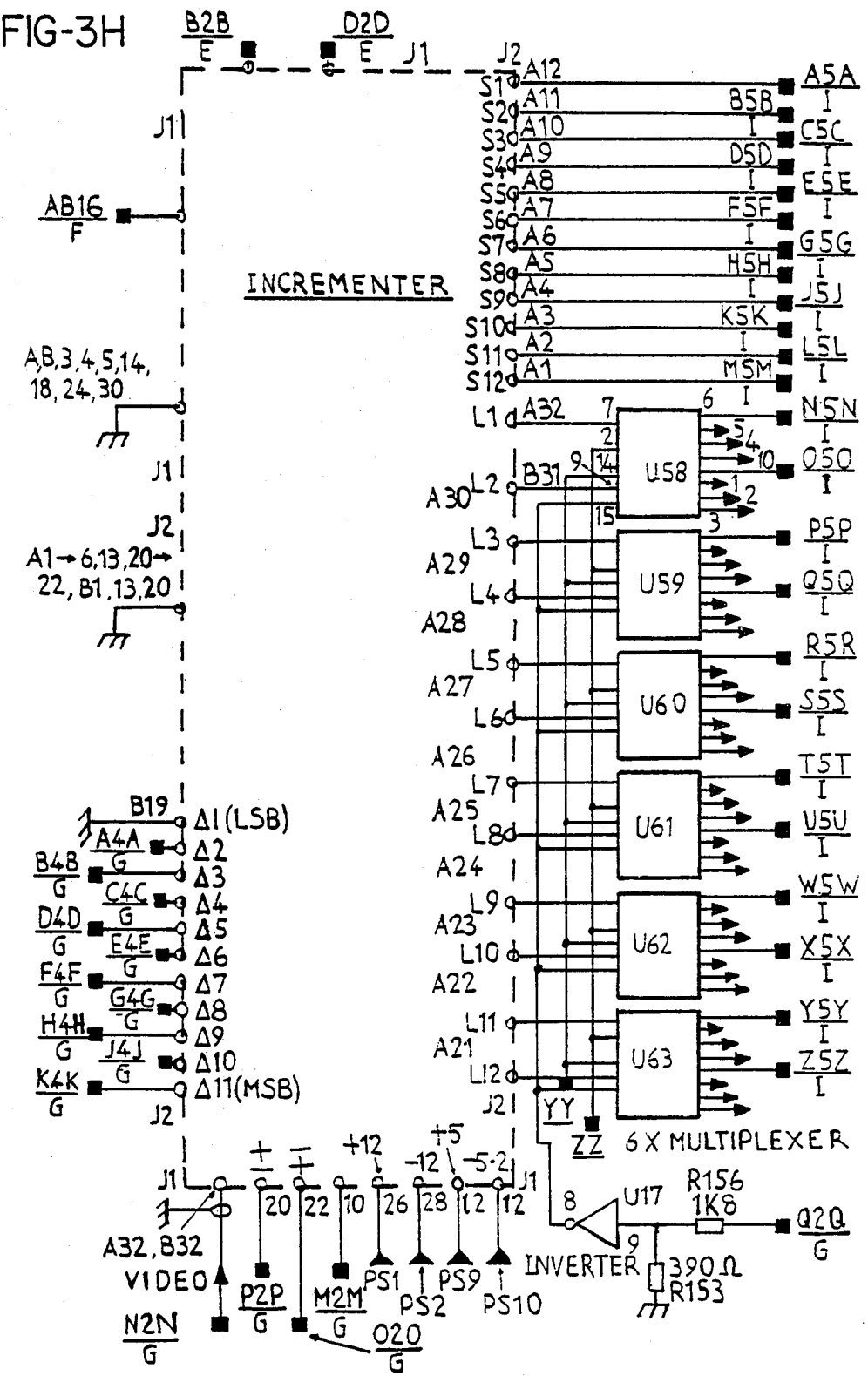
Figure 3K:
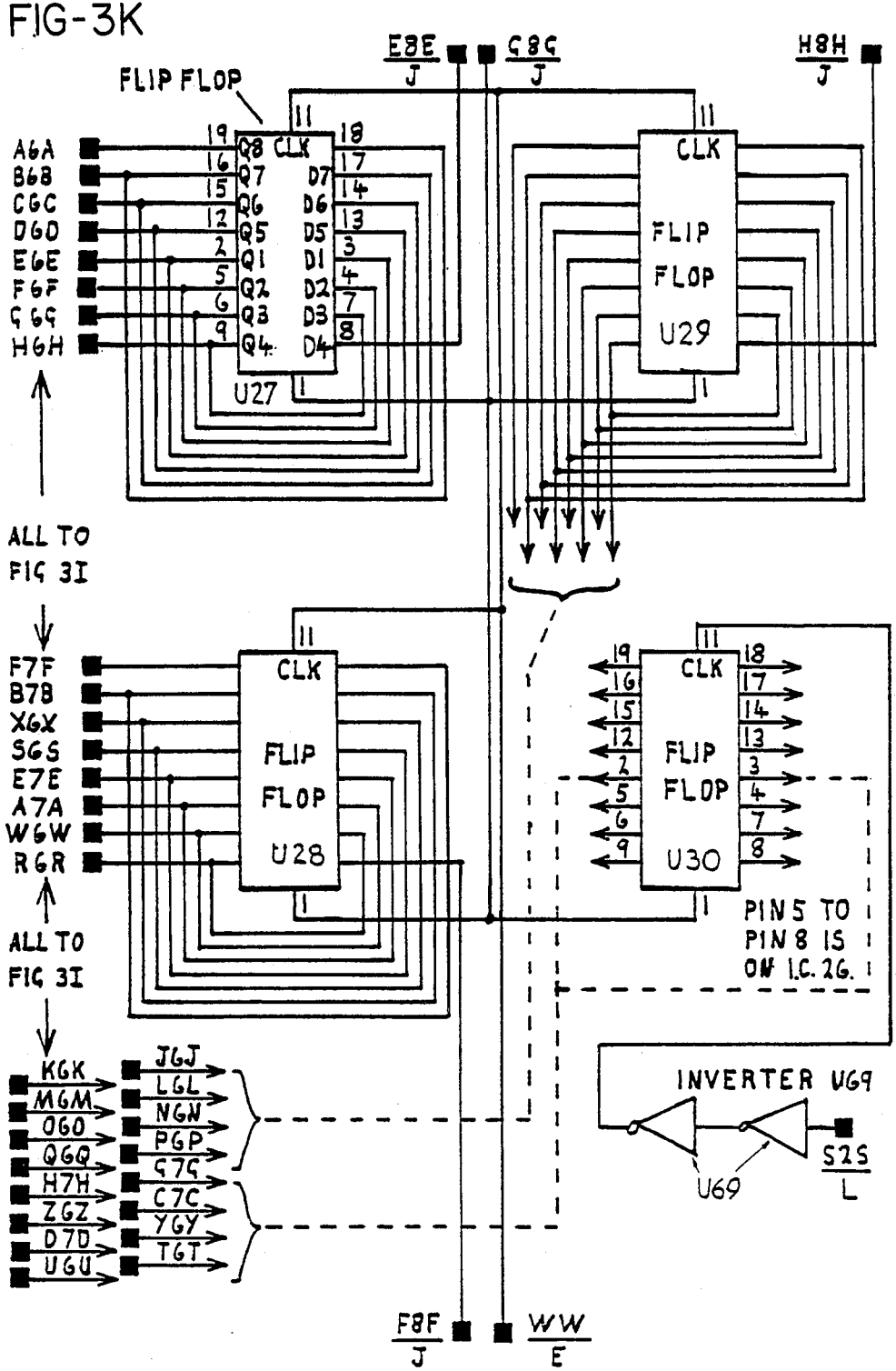
Figure 3L:
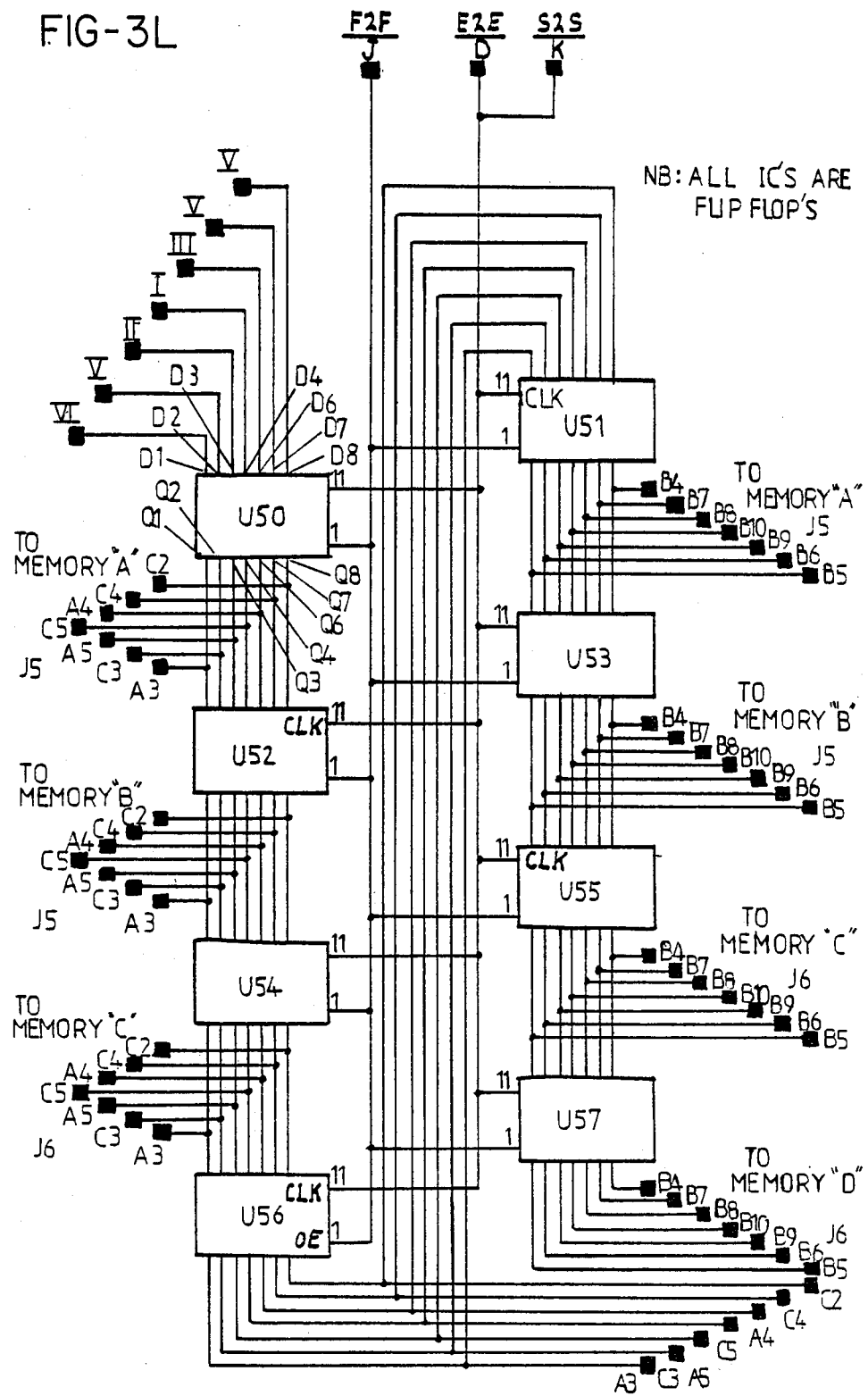

Bearing in mind the initial condition for the inner convergence process i.e. $v_{out}(0) = v_{in}$ and letting the inequality $\Delta << v_{in}$ apply, we shall assume that the excursions of the ensemble of voltages $m\Delta$ are confined to the essentially linear region of the probability function for $\rho$ given by (1) near $m=0$ (see FIG. 2). If a solution can now be found then such a solution will in itself be a test for the validity of the above approximation. The proportionality between $\rho$ and $m\Delta$ near $m=0$ is found from (1) to be:

$$\rho \approx \frac{m\Delta}{\sqrt{2\pi}\, V_{in}} V \quad (2)$$

Hence the probability of a down movement at $m\Delta$ may now be approximated by:

$$\rho = \frac{1}{2}\left(1 - \frac{2m\Delta}{\sqrt{2\pi}\, V_{in}}\right) - \quad (3)$$

$$-\frac{\sqrt{2\pi}\, V_{in}}{2} < m\Delta < \frac{\sqrt{2\pi}\, V_{in}}{2}$$

and the probability of an upward movement by $$= \frac{1}{2}\left(1 + \frac{2m\Delta}{\sqrt{2\pi}\, V_{in}}\right), - \quad (4)$$

$$-\frac{\sqrt{2\pi}\, V_{in}}{2} < m\Delta < \frac{\sqrt{2\pi}\, V_{in}}{2}$$

The approximation has thus achieved a simplified problem formulation which is now seen to be identical to that of a discrete one dimensional random walk of an elastically bound particle. A detailed solution of this problem is given in M. Kac "Random Walk & Theory of Brownian Motion" Am. Math. Monthly, 14:369 (1947). According to this formulation the probabilities of the voltage moving down or up at each decision instant are $$\frac{1}{2}\left(1 - \frac{m}{R}\right) \text{ and } \frac{1}{2}\left(1 + \frac{m}{R}\right), -R < m < R \quad (5)$$

respectively. This leads to a difference equation for the conditional probability whose solution is shown to be:

$$p_2(s\Delta/\eta\Delta;\eta\tau) = \frac{(-1)^{R-s}}{2^{2R}} \sum_{j=-R}^{R} \left(\frac{j}{R}\right)^\eta C_{R+j}^{(1-s)} C_{R+m}^{(j)} \quad (6)$$

Although this is the correct solution to our discrete random walk model involving quantized voltage levels the format of (6) does not readily lend itself to an interpretation of the behaviour of the variance of $m\Delta$. A more convenient form of the solution is the continuous case which may be derived from (6) by letting $$\tau \to o, \Delta \to o, \frac{\Delta^2}{2\tau} = D, \frac{1}{R\tau} = \gamma,$$

$$s\Delta \to V_o \text{ and } m\Delta \to V.$$

$v$ is now a continuous approximation to the discrete variable $m\Delta$ and for which the second order probability density function is found to be (see Kac, Supra and an introduction to statistical Communication Theory, D. Middleton, McGraw Hill (1960) pp 438–466):

$$W_2(V_o/V;t) = \frac{e^{-\frac{(V-V)^2}{\sqrt{2\pi}\,\sigma}}}{\sqrt{2\pi}\,\sigma} \quad (7)$$

where $V = V_o e^{-\gamma t}$ \quad (8)

and $\sigma^2 = \frac{D}{\gamma}(1 - e^{-2\gamma t}) = \sigma_o^2(1 - e^{-2\gamma t})$ \quad (9)

and for $V_o = O$:

$$W_2(o/V;t) = \frac{e^{-\frac{V^2}{\sqrt{2\pi}\,\sigma}}}{\sqrt{2\pi}\,\sigma} \quad (10)$$

the validity of (10) being subject in our situation to the conditions:

$$\frac{1}{\gamma} >> \tau \text{ and } \sigma >> \Delta \quad (11)$$

Thus, at any pixel, the deviation of the output voltage from the mean input voltage (V) at that pixel is seen to have a gaussian distribution whose variance approaches a final value $D/\gamma$ with a time constant $\frac{1}{2}\gamma$. The initial $\sigma$ value of zero corresponds to our knowledge that $v(t=0)=0$ with a probability of 1.

The identical result (10) is obtained by solving the first order Langevin equation which describes the physical process governing the behaviour of the ensemble of pixel voltages all subject to identical statistics and all subject to the initial condition $v(t=0)=0$ i.e. $\frac{dV}{dt} + \gamma V(t) = f(t)$ \quad (12)

where $f(t)$ is a purely random gaussian function with mean value $\overline{F(t)} = 0$ and $\overline{f(t_1)F(t_2)} = 2D\delta(t_2 - t_1)$ In the analysis that follows, the convergence process shall be analysed in terms of the power ratio:

$$\rho(t) = \frac{V_{out}^2(t)}{V_{in}} \quad (13)$$

where $v_{in}$ is constant.

Notice from equation (10) that the value of $\sigma^2$ diverges from an initial value zero to its final (stationary) value $\sigma_\infty^2$. In the convergent situation the initial value of $\sigma^2(=\sigma_o^2)$ will be greater than $\sigma_\infty^2$. Because the stochastic differential equation (12) for the process is linear we can expect $\sigma^2$ to approach $\sigma_\infty^2$ with the same time constant ($\frac{1}{2}\gamma$).

Thus in the convergent case:

$$\sigma^2 = (\sigma_o^2 - \sigma_\infty^2)e^{-2\gamma t} - \sigma_\infty^2 \quad (14)$$

Combining (3), (5) and (14) and observing the proportionality between $\sigma^2$ and $\rho$ we find:

$$\rho(t) = (\rho_o - k_1\Delta)e^{-k_2\Delta t} + k_1\Delta \quad (15)$$

where $\rho_o = \frac{V_{out}^2(o)}{V_{in}^2}$, \quad (16)

$$k_1 = \sqrt{\frac{\pi}{8}} \frac{1}{V_{in}}$$

and $k_2 = \sqrt{\frac{8}{\pi}} \frac{1}{\tau V_{in}}$ \quad (17)

Furthermore if we apply the initial condition $\rho_0 = 1$ for inner convergence we have:

$$\rho(t) = (1 - k_1\Delta)e^{-k_2\Delta t} + k_1\Delta \quad (18)$$

Notice that the ultimate value of Voltage enhancement ratio for a given value of $\Delta$ is:

$$\frac{V_{in}}{V_{out}}(t \to \infty) = 4\sqrt{\frac{8}{\pi}} \sqrt{\frac{V_{in}}{\Delta}} = 1.263 \sqrt{\frac{V_{in}}{\Delta}}. \quad (19)$$

Let us examine the convergence behaviour in more detail with the help of equation (18). A conflict in the choice of $\Delta$ is immediately apparent. If we make $\Delta$ as small as possible in order to achieve a good ultimate reduction ratio $\rho(t \to \infty)$ the convergence rate is slow. Conversely, if we aim for a faster convergence rate by choosing a higher value of $\Delta$ the ultimaate power reduction ratio suffers. Intuitively we may anticipate an optimum performance $\rho(t)=\rho_{opt}(t)$ by continuously (within quantization constraint) reducing the value of $\Delta$ according to some predetermined algorithm $\Delta_{opt}(t)$.

The function $\Delta_{opt}(\rho)$ may be found by determining the values of $\Delta$ which will give the steepest slope at all points along the curve $\rho(t)$. We know that at any time $t_1$, the slope is equal to the gradient of the function (cf (15));

$$\rho_1(t) = (\rho - k_1\Delta)e^{-k_2\Delta(t-t_1)} - k_1\Delta \qquad (20)$$

$$\text{i.e } \frac{d\rho}{dt}\bigg|_{t_1} = \frac{d\rho_1}{dt}\bigg|_{t_1} = -k_2\Delta(\rho - k_1\Delta) \qquad (21)$$

and the maximum gradient at $t=t_1$ occurs when (differentiating (21) w.r.t. $\Delta$)

$$\Delta = \Delta_{opt}(t_1) = \frac{\rho}{2k_1} \qquad (22)$$

but (22) is true for all values of $t_1$, $$\text{i.e. } \Delta_{opt}(t) = \frac{\rho}{2k_1} \qquad (23)$$

Substituting (23) in (21) we obtain:

$$\frac{d\rho}{dt} = -\frac{k_2\rho^2}{4k_1} \qquad (24)$$

whose solution when subject to the initial condition $\rho(o) = 1$ yields the sought function: (25)

$$\rho_{opt}(t) = \frac{1}{1 + \frac{k_2 t}{4k_1}} = \frac{1}{1 + \frac{2t}{\pi\tau}}$$

Alternatively, expressed in terms of the number of frames (n) processed (25) becomes:

$$\rho_{opt}(\eta) = \frac{1}{1 + \frac{2\eta}{\pi}} \approx \frac{\pi}{2\eta} \text{ for } \eta \gg 1 \qquad (26)$$

The voltage enhancement ratio is then:

$$\left.\frac{V_{in}}{V_{out}}\right|_{opt} = \sqrt{\frac{2}{\pi}}\sqrt{\eta} \simeq 0.8\sqrt{\eta} \qquad (27)$$

which compares favourably with the theoretical limit as set by the summing algorithm:

$$\left.\frac{V_{in}}{V_{out}}\right|_{sum} = \sqrt{\eta} \qquad (28)$$

Notice that according to equations (25), (26) and (27) the enhancement ratio would increase ad infinitum with increasing time. Obviously the maximum value of voltage enhancement ratio corresponding to the smallest value of $\Delta$ is determined by the smallest quantizing step (as determined by the value of M). From (19) this asymptotic value is seen to be:

$$\left.\frac{V_{in}}{V_{out}}\right|_{limit} = 4\sqrt{\frac{8}{\pi}}\sqrt{\frac{V_{in}}{\Delta_{min}}} \qquad (29)$$

In summary the optimum convergence process in terms of voltage enhancement ratio is seen initiaally to follow a quadratic law according to (27) until a "breakpoint" value is reached and thence to asymptote to a value defined by (29). The number of frames taken to reach the breakpoint value may be considered as an index for the conversion rate for a particular value of $V_{in}$ and is given by:

$$\eta \text{ break pt.} = \sqrt{2\pi}\,\frac{V_{in}}{\Delta_{min}} \qquad (30)$$

So far we have considered only systems for which all bits of the pixel word are converted to an analog signal to close the feedback loop at the comparator input. The function of the Digital-to-Analogue converter is one of ensuring a proportionality between the stored pixel values and the feedback component. The speed requirements on the Digital-to-Analogue converter are quite stringent and some hardware simplification may be achieved by using a converter of reduced resolution (i.e. N<M) provided that N is sufficiently large for the gray-scale requirements of the system to be met.

The effect of truncating the stored pixel word by omitting some of the less significant bits in the conversion process is discussed below.

Obviously for input noise levels less than the smallest resolvable step of the converter $(M-N)\Delta_{min}$ we would expect no enhancement whatsoever. On the other hand for input noise levels much greater than $(M-N)\Delta_{min}$ we would expect little performance degradation due to the coarser conversion quantising as long as the residual output noise level was much larger than $(M-N)\Delta_{min}$. Intuitively it would seem that the degradation in enhancement would not be seriously affected (irrespective of the input level) until the residual output level was comparable with $(M-N)\Delta_{min}$. Most practicle situations (as discussed hereinafter) allow the value N to be determined solely by the gray-scale resoltuion requirements of the system. In such cases it has been empirically found that the lower limit on absolute output noise level is comparable in magnitude to the quantising noise for an N bit system.

The function of the incrementer controller 5 is to generate the appropriate sequence of $\Delta$ values for correct outer convergence and optimum inner convergence. It will be remembered that for the outer convergence the sequence for $\Delta$ is: 1st frame—MSB, 2nd frame—2nd MSB and so on.

The optimum inner convergence process commences with a $\Delta$ value (see equation (23)) equal to $$\Delta_{opt}(0) = \frac{1}{2k_1} = \sqrt{\frac{2}{\pi}}\,V_{in} \qquad (31)$$

Thereafter the value of $\Delta$ must be varied according to equation (23), $$\text{i.e. } \Delta_{opt}(\eta) = \frac{\rho}{2k_1} = \frac{\sqrt{\frac{2}{\pi}} V_{in}}{1 + \frac{2\eta}{\pi}} \simeq \sqrt{\frac{\pi}{2}} \frac{V_{in}}{\eta} \text{ for } \eta >> 1 \quad (32)$$

It has been found that a quite coarse discrete approximation $\overline{\Delta}_{opt}(n)$ to (32) exists which represents a considerable hardware saving while at the same time causing negligible impairment to the convergence rate.

Bearing in mind that the outer convergence process involves preferred values of $\Delta$ corresponding to discrete bit magnitudes, the convenience of using the same preferred values of $\Delta$ for the inner convergence process is apparent. Using this approach the inner convergence behaviour for $\rho(t)$ would take the form of a discrete sequence of exponential decays.

The discrete sequence $\overline{\Delta}_{opt}$ (n) approximating the curve $\Delta_{opt}$ (n) may be tabulated thus:

$$\overline{\Delta}_{opt}(1) = \Delta_1 = \overline{\Delta}_{opt}(0) \quad \text{(see discussion later)}$$

$$\overline{\Delta}_{opt}(2 \text{ to } 3) = \frac{\Delta_1}{2}$$

$$\overline{\Delta}_{opt}(4 \text{ to } 7) = \frac{\Delta_1}{4}$$

$$\vdots$$

$$\overline{\Delta}_{opt}(2^Q \text{ to } 2^{Q+1} - 1) = \frac{\Delta_1}{2^Q}$$

Substituting these values for $\Delta$ in (15) and remembering that $t = n\tau$ we obtain the relationship between the power ratio at the beginning ($\rho_Q$) and the end ($\rho_{Q+1}$) of the Q th exponential decay section:

$$\rho_{Q+1} = c\rho_Q + \frac{1-c}{2^{Q+1}} \quad (33)$$

where $c = e^{-\frac{4}{\pi}} = 0.27992$ and with a little algebra:

$$\rho_Q = c^Q + \left(\frac{1-c}{1-2^c}\right)\left(\frac{1}{2^Q} - c^Q\right) \quad (34)$$

where the frame number $n = 2^Q - 1$ It can be easily shown that the convergence process as defined by equation (34) is a good approximation to $\rho_{opt}$ (n) as per equation (26), the error being less than 5% over the range of interest. The asymptotes are of course the same in both cases (being defined by (29)).

It is evident from equation (23) that the choice of the optimum convergence algorithm depends on the input noise level as this determines the initial conditions of the inner convergence process. The apparatus desirably therefore has a control for selecting the best algorithm to span a wide range of input noise levels. With the algorithm as given by $\rho_{opt}(n)$ (26) such a control would be continuous and thereby allow an optimum matching of the algorithm to the input noise level.

With the algorithm as given by $\rho_Q$ (34) we no longer have a continuous control due to the preferred fixed values of $\Delta_1$. The control in this case is a geometric series with adjacent settings differing by a facter of 2. In practice this does not lead to significant performance degradations as the signal-to-noise ratios in typical operational situations are not accurately known anyway. Ideally the chosen setting would put $\Delta_1$ as close as possible to the value $$\sqrt{\frac{2}{\pi}} V_{in}$$

of the particular signal to be processed. A preferred filter is shown in FIG. 3 and follows the block schematic of FIG. 1.

Such filter is suitable for the 625/50 T.V. system. The instrument is designed primarily for the scientific market and comprises a square 512×512 pixel frame store matrix.

A design goal requiring noise voltage enhancement ratios in excess of 100 (for appropriately large input noise levels) dictates a pixel word depth of 12 (M=12), whereas a gray-scale resolution of 8 bits per pixel word was considered adequate to meet the needs of most applications.

A pixel word duration of 69 ns places some quite critical performance criteria on the pixel incrementing circuitry.

Each 12-bit pixel word has to be retrieved from the memory, D/A converted, compared with the incoming video signal and modified by $\Delta$(another 12 bit word) within a 69 ns time-slot. No sufficiently fast 12-bit D/A converter was available at the time of design and the choice thus fell on the Motorola chip MC10318—an 8-bit (i.e. N=8) device with a settling time of around 10 ns. A suitable voltage comparator was found in the AMD 685—a 6 ns latched device. All digital operations associated with the incrementor have been designed in ECL logic.

The only cost effective type of memory device was the 16k dynamic RAM whose read—modify—write cycle time is typically 375 ns. The data rate commensurate with a 69 ns pixel duration has been achieved with a stagger-phased combination of 8 such memory chips. The incrementor controller is implemented according to the $\rho_Q$ algorithm (see equation (34)) with $\Delta_1$ values selectable from MSB down to LSB (the latter giving purely an outer convergence process). The corresponding values of video input signal-to-noise ratio catered for (in terms of optimum convergence times) thus range from 4 dB in 3 dB steps up to 37 dB. Signal-to-noise ratios less than 8 dB are of course also capable of being processed but with sub-optimum convergence times.

The temporal filter has been designed with a front-end video signal processor capable of providing a large range of gain and level shifts.

The detailed circuit description is shown in FIGS. 3 to 7 and and are as follows. The overall circuit is shown in FIG. 3.

The circuit has the following features:

Instrument controls have been provided to give the equipment the following facilities:

1. "Integration Mode" (switch S1 FIG. 6A) controls the incrementer 3 such that in the "Peak" mode, only positive increments are recognised and processed thus allowing an irreversible build up of brightness of an image being processed. The normal position of this switch is the "Mean" position whereby the incrementer 3 operates as has been described so far.

2. "Step Size" (switch S2 FIG. 6B) allows the selection of a particular increment size. Also the last position of the switch enables one of eleven fast convergence algorithms according to the setting of S3 (see item 3 which follows.

3. "Integration Time" (switch S3 FIG. 6B) sets the initial increment size according to the a priori knowledge of the input signal-to-noise ratio and thereby determines the total time taken to complete the convergence algorithm.

4. "Video Polarity" (switch S4 FIG. 6A) enables the stored video signal to be inverted to achieve a "negative" display effect.

5. "Display Mode" (switch S5 FIG. 6A) allows the selection of the output video between input only (Direct) stored only (Stored) and stored blended into input (Insert).

6. "Field Select" (switch S6 FIG. 6C) allows the selection of each TV field (i.e. half the total memory) for display as a complete TV frame.

7. "Input Set-Up" (switch S7 FIG. 6A) affects a selectable DC shift of the input processor.

8. "Input Gain" (switch S8 FIG. 6A) affects a selectable gain of the input processor.

9. "Reset" (momentary switch K3 FIG. 6C) sets all pixel locations of the memory to black level.

10. "Start"(momentary switch K2 FIG. 6C) initiates the incrementing process.

11. "Hold" (momentary switch K1 FIG. 6C) terminates the incrementing process and holds the memory contents unchanged until the activation for either "Start" or "Reset". The I.C.'s used are identifable as follows:

designated as follows B2B, B3B, B4B etc. Similar considerations apply for each of the letters C, D E etc.

INCREMENTING OPERATION

The video input signal is passed through a buffer amplifier and clamp (U1 and U2 FIG. 1) and thence via a low pass filter to a variable gain and level processing stage (Q4 to Q8 FIG. 3). The processed video signal is now converted from an unbalanced to balanced format (Q1, Q2, Q3 FIG. 4) before being presented to the input of a voltage comparator (pins 3 and 4 of IC U21 FIG. 4). This comparator corresponds to the functional block 2 of FIG. 1. The Digital-to-Analogue converter U5 output (pins 14 and 15) forms a balanced drive to the cascode stage (Q4 and Q5) whose balanced current source output is subtracted from the balanced video signal (representative of the video input) at the comparator input (pins 3 and 4). In this way the sign of the difference between the video input signal and the D to A converter output signal is generated at the complementary output (pins 11 and 12 of the U21) of the comparator. This one bit word is stored within the comparator (The AMD685 has a latching capability) in response to the latch enable command which appears at pixel rate at pin 6 of the comparator. The complementary binary signal at the comparator output (pins 11 and 12) corresponds to the SGN parameter of FIG. 1.

The digital memory of the instrument is made up to 192 16K dynamic RAM chips (The industry standard 4116) whose storage capacity forms a raster matrix of 512×512 picture elements each of which constitutes a 12 bit word.

During the incrementing process these memory chips

| IC IDENTIFICATION | | | |
|---|---|---|---|
| U1 LM3086 | U21 DM7407 | U41 DM74157 | U66 DM74300 |
| U2 LM3086 | U22 DM7404 | U42 DM74157 | U67 CD4069 |
| U3 LM3086 | U23 DM74123 | | U68 74C221 |
| U4 DM4011 | U24 DM7402 | | U69 DM74304 |
| U5 74C221 | U25 DM74123 | U50 DM74LS374 | U70 LM7805 |
| | U26 DM74123 | U51 DM74LS374 | U71 LM7812 |
| U7 LM3086 | U27 DM74LS374 | U52 DM74LS374 | U72 LM7812 |
| U8 LM3086 | U28 DM74LS374 | U53 DM74LS374 | U73 LM7812 |
| U9 CD4069 | U29 DM74LS374 | U54 DM74LS374 | U74 LM7812 |
| U10 CD4013 | U30 DM74LS374 | U55 DM74LS374 | U75 LM7805 |
| U11 74C221 | U31 DM7430 | U56 DM74LS374 | U76 LM7812 |
| U12 CD4011 | U32 DM74191 | U57 DM74LS374 | U77 LM7812 |
| U13 CD4013 | U33 DM74123 | U58 DM74S153 | |
| U14 74C221 | U34 DM7430 | U59 DM74S153 | |
| U15 CD4080 | U35 DM74191 | U60 DM74S153 | |
| U16 CD4013 | U36 DM7404 | U61 DM74S153 | |
| U17 DM74504 | U37 DM7430 | U62 DM74S153 | |
| U18 DM7474 | U38 DM74191 | U63 DM74S153 | |
| U19 AMD685 | U39 DM7474 | U64 DM7474 | |
| U20 DM74500 | U40 DM74191 | U65 DM74574 | |

It should be noted that in FIGS. 3A–3K, 4A 4B, 6A–6C, the individual A,B,C, etc figures are combinable to produce an overall diagram of the respective part of the circuit designated by the individual figure numbers 3, 4 and 6.

Figure 4B:
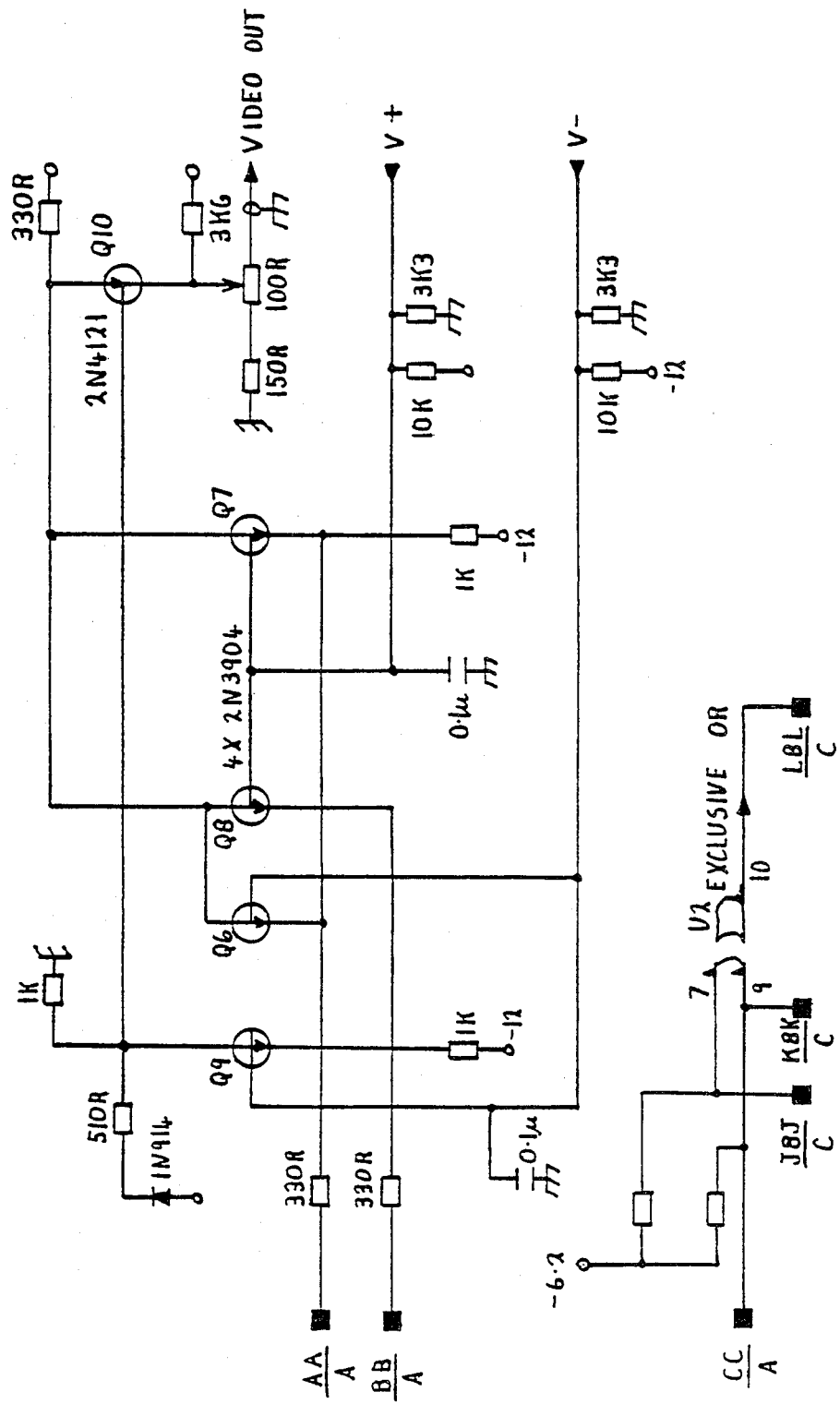
Figure 5:
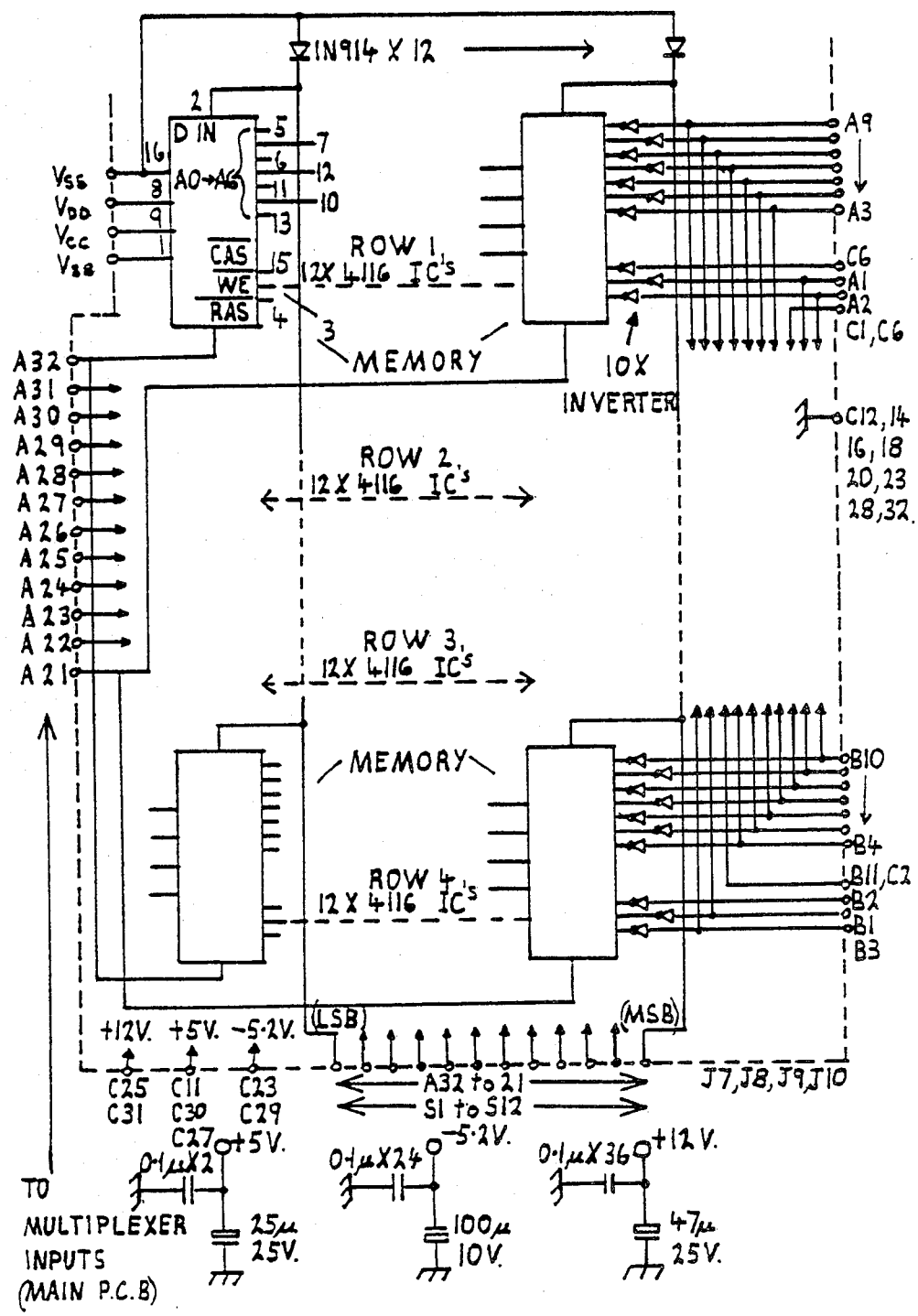
FIG. 5 is a diagram of the memory circuit of FIG. 3.
Figure 6A:
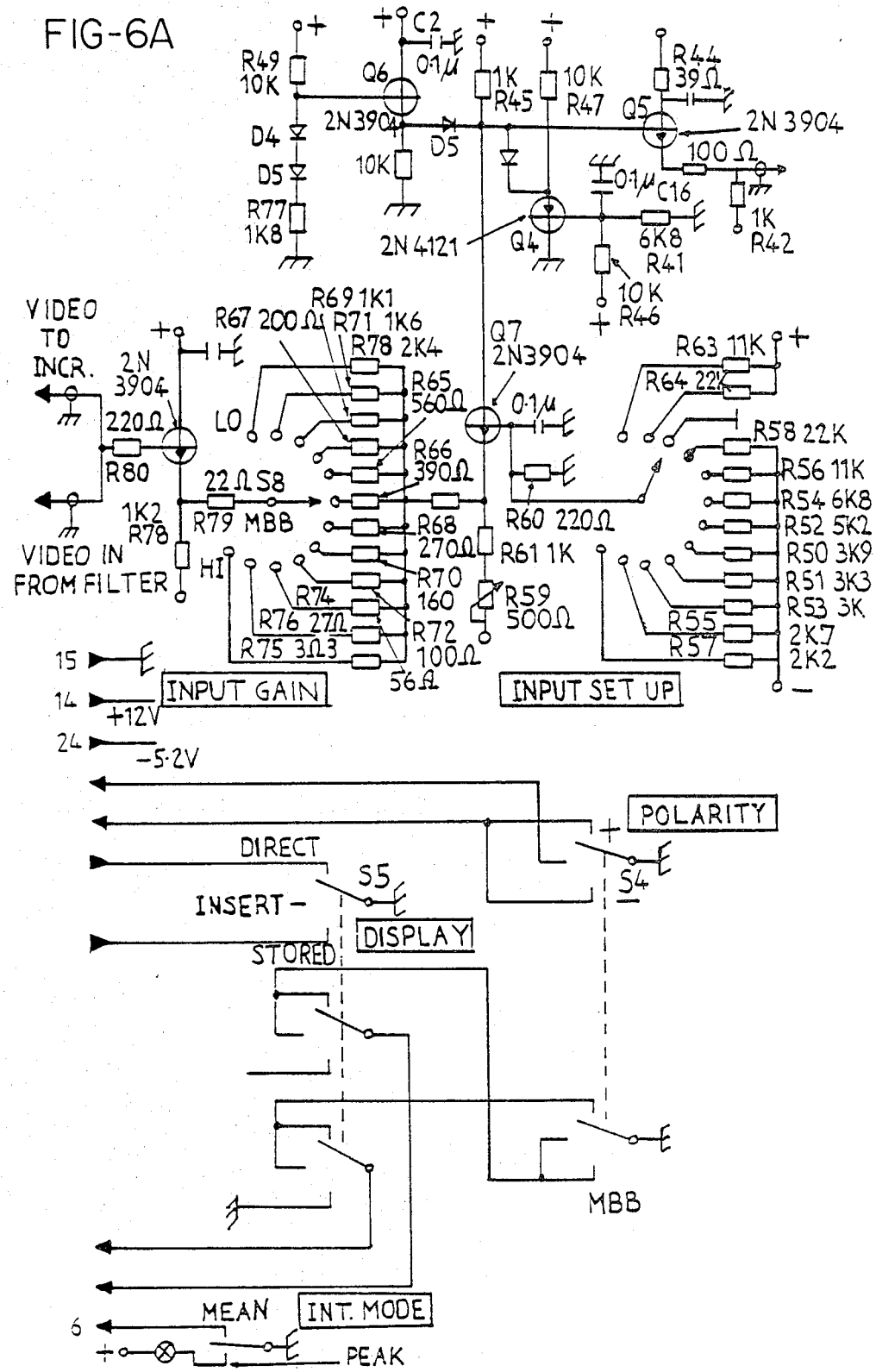

It should also be noted that where a circuit line leaves one figure, say FIG. 4A, it will be designated say (BB)/B. This in turn means that it connects with circuit line (BB)/A in FIG. 4B.

In all cases the letter in the denominator designates which of the FIGS. A–L in the case of FIGS. 3, that it connects with.

Similar consideration applies to each of the lines in FIGS. 4 & 6. Where BB is repeated several times it is are operated in the "read-modify-write" mode whereby a picture element word is extracted from the memory, modified in the incrementor and written back into the same memory location. When incrementing ceases the memories are operated in the read mode. The data bits are accessed at pin 14 of the memory chips and are written back into the memory by presenting the modified bits at pin 2. In order to achieve data read and write rates commensurate with the picture element rate of incoming video signal the memory bank is divided in to 8 groups of chips per T.V. field. The members of the 8 groups are addressed cyclicly out of phase in order to achieve a high data rate. The circuit diagram of the memory shown in FIG. 5. constitutes one quarter of the total memory bank of the instrument.

Four identical circuit boards make up the complete memory bank A, B, C and D. Note that each circuit board contains rows of chips 1 to 4. The addressing sequence may now be described thus: ODD T.V. FIELDS: A1, B1, C1, D1, A3, B3, C3, D3, A1, B1, etc. EVEN T.V. FIELDS: A2, B2, C2, D2, A4, B4, C4, D4, A2, B2, etc.

Addressing of the memory chips is accomplished in the normal way according to the row and column address multiplexing method. In order to comply with dynamic RAM refresh requirements the addressing pattern has been chosen such that all row address locations are cycled in less than 2 ms. In this way the need for a separate refresh cycle disappears.

Figure 7A:
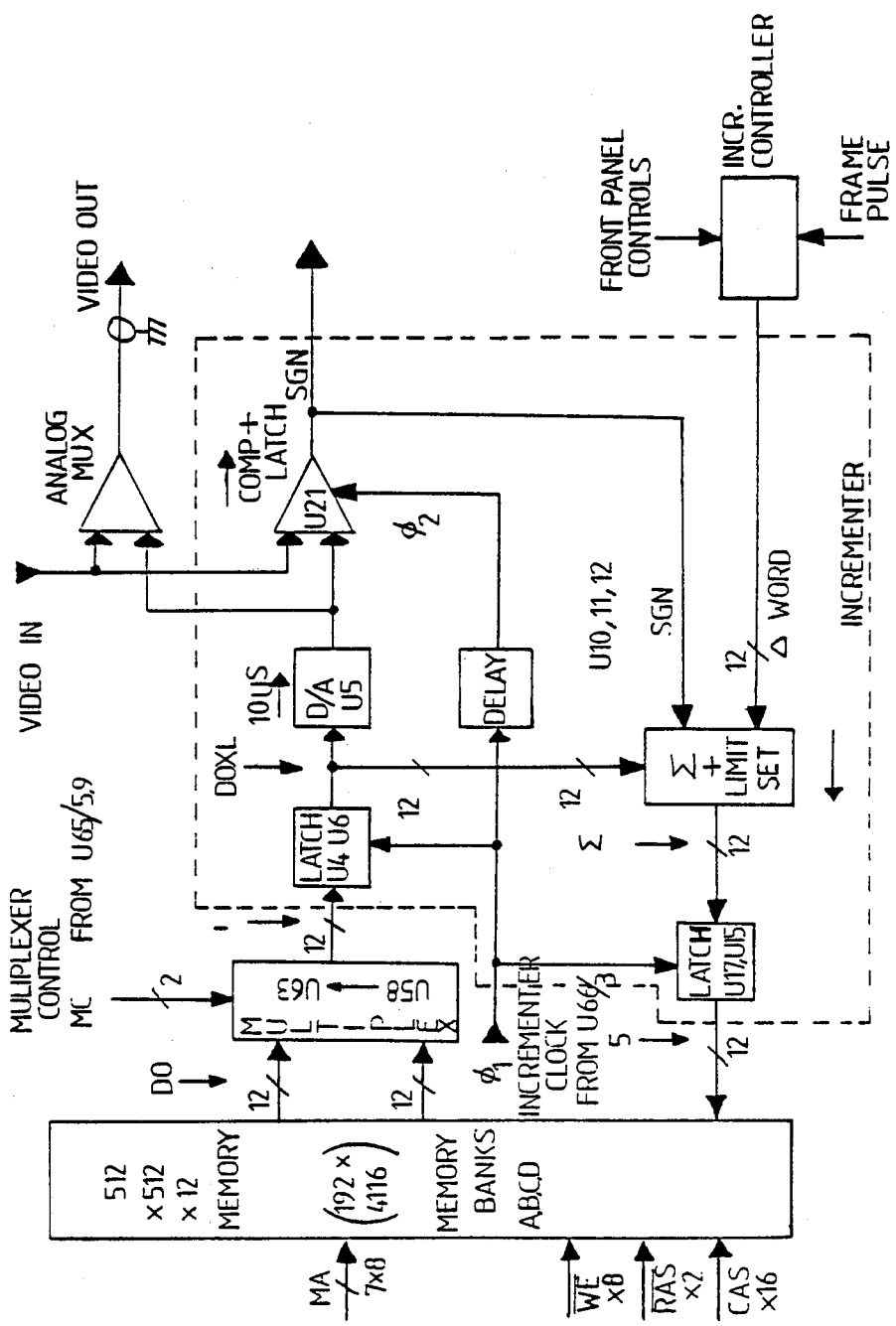
FIG. 7B is a timing diagram of the embodiment of FIGS. 1 and 3.

A timing diagram of the 8-phase clocking cycle is shown in FIG. 7B. Here we follow the event sequences pertaining to the memory group A1. It should be noted that the event sequences for each of the other memory groups are identical except for a time shaft. The generation of the multiplexed address word pattern is realised in U31, U32, U34, U35, U37, U38, U39, U40, U41, U42 FIG. The address pattern is then passed through an 8 stage shift register bank (U50 to U57 FIG. 3) to achieve the desired 8-phase format as fed to the memory bank via connectors J7 to J10. The row address strobe pulse, column address strobe pulse and write enable pulse are generated in U23 and U26 (FIG. 3) and are presented in the required 8-phase format to the memories via U27 to U30 (FIG. 3).

The stored picture element word (12-bit) stream appears in serial format at the outputs (pins 7 and 9) of the multiplexing IC's (U58 to U63 FIG. 3) and corresponds to the quantity L of FIG. 1. The picture element word stream (TTL format) is translated to ECL format within the incrementer (U7, U8 and U9) and latched by means of type D flip flops (U4 and U6).

The 8 most significant bits of the picture element word stream (L) are fed to the Digital-to-Analogue converter (MC 10318—U21 pins 1 to 8). All 12 bits of the picture element word stream are fed to the input of a 12-bit adder/subtractor (corresponding to functional block 3 of FIG. 1) as implemented by means of three ALU chips of type MC 10181 (U10, U11 and U12 pins 10, 16, 18 and 21). The other (12-bit) input word corresponding to the quantity D of FIG. 1. to this adder/subtractor is derived from the Incrementor controller FIG. 6 and is generated according to the algorithem for $D_{opt}$. D appears at the pins 9, 11, 19 and 20 of the three ALU chips that make up the adder/subtractor. The 12-bit output of the adder/subtractor (pins 2, 3, 6 and 7) corresponds to the quantity S of FIG. 1 and is equal to either the sum quantity L+D or the difference quantity L-D according to the sense of the SGN parameter as present in complementary form at pins 11 and 12 of the voltage comparator U21. The value S thus derived is in accordance with the incrementing algorithm and must be written into the same memory location as the picture element word L from which it was derived. The 12 type D flip-flops (IC's 17 and 18) serve to hold the 12 bits of S for the most optimum time slot available for writing back into the memory. The interface chips 16, 19 and 20 translate the ECL format into the TTL format as required by the memory chips. See FIG. 7B for timing details of the incrementing process.

The balanced analog output of the Digital-to-Analogue converter serves also as a basis for the derivation of the output signal. Transistors Q7 to Q10 (FIG. 3) form a balanced to unbalanced buffer stage with selectable signal inversion. The analog signal thus generated contains only picture information and is devoid of synchronising pulses. The mixing amplifier (U7 and U8 FIG. 3) serves to blend the stored (analog) signal into the input video signal and thereby restoring synchronising information. At the same time this amplifier provides the facility of additive mixing of the inverted stored signal with the incoming signal for comparison measurements. Finally the output signal is presented in $1v_{pp}$ (75Ω) format via Q5 FIG. 3.

TIMING PULSE GENERATION

All timing pulses, as required by the memory PCB;3 s the Incrementor and the Incrementor Controller are generated on the main circuit (FIG. 3) and are locked to the synchronising pulses of the incoming video signal.

Separation of the synchronising pulses from the input video signal is performed by U3. A negative polarity composite synchronising pulse in CMOS format is available at U4 pin 4. The origin of this signal is selectable between video input and external composite sync input by means of a sync selector switch on the rear panel. U11 (pin 1 and 4) is a one-shot timed to suppress the twice line frequency components associated with the equalising and serration content of the composite sync pulse stream. Thus, the pulse stream at pin 4 of U11 will be at T.V. line rate only. The purpose of the field pulse detector (U10 pins 8 to 13) and the gate (U12) back to back one-shot arrangement (U14) is to provide missing line pulses when the input video contains a non-standard industrial sync. format. The two halves of U14 form a self-sustained oscillation capable of "flywheeling" over broad vertical pulses and thereby providing the missing line pulses. The importance of this is to maintain clock continuity to the memory bank during the vertical block.

U17 (pins 1 and 2) serves to level shift the line reference pulse into TTL format.

U19, U20 (pins 11, 12,13) and U21 (pins 8, 9, 10) form a gated oscillator operating at the picture element rate of 14.5 MHz and which is locked to the T.V. line reference pulse. The incrementor clock pulse is derived directly from the 14.5 MHz via the pulse former (C46, C47, R141) and gate (U66 pins 11, 12, 13). Also the clock pulse for the 8 phase shift registers (U50 to 57) is derived from the 14.5 MHz via a phase shift network (U22 pins 11 to 13) A further phase shift (U69 inverter propagation delays) derives the clock pulse for the generation of the 8 phase memory write enable pulse. The 14.5 MHz clock pulse for the generation of both 8 phase row and column address strobe pulses are taken directly from U22 pin 12.

The drive to the memory address word generator is taken via U18 pins 3, 6 (which performs a frequency halving) and U21 pins 1, 2, 3, 11, 12, 13 which performs the gating function for correct positioning of the clock pulse to the divide by 32 counters (U32, 35). U39 (pins 1 to 6) provides a clock gating drive to prevent address word overflow at the termination of the count for each T.V. line.

U18 supplies a complementary drive to the video switch U7 and U8. Switching points are defined by the trailing edges of the one-shots U33. Vernier control of the commencement of stored signal blend-in boundary is achieved by R181. Vernier control over the end of the blend-in boundary is achieved by R172. U20 (pins 4, 5, 6, 8, 9, 10) allow manual overide of the window blend-in drive by the front-panel "diaplay" control to obtain either "direct" (i.e. input signal) only or "stored" signal only.

The one-shots of U25 define the position and width of the X-Y enable command—relevant only when the application of the instrument is extended to X-Y (as well as T.V.) scan.

The flip-flops U64 and U65 provide a coherent two-bit drive to the 4-way multiplexers U58 to U63. The function of these multiplexers is to convert the 12-bit parallel data stream as accessed in the memory banks into a 12-bit serial stream as required by the incrementor.

Separation of the field pulse from the incoming composite sync component pulse is achieved by means of the integrating network R132, C32 and subsequent schmitt trigger U67 (pins 1, 2, 13, 13). U68 and U10 (pins 1 to 6) constitute the frame pulse discriminator. U16 in conjunction with U22 (pins 1,2,5,6) and U24 (pins 1 to 6) define the field alternating drive to the two halves of the memory bank corresponding to the two T.V. fields. Selection of either field (front panel control) is made possible by means of a reset or set command to U16 via U12 (pins 4, 5, 6) or U9 (pins 8,9) respectively. The one-shot U11 (pins 9,12) is set to approximately 90% of the field period and by inhibiting the generation of the field pulse in U68 (pins 10, 5) improves the systems noise immunity by reducing the probability of interference from false field pulses.

The vertical position of the video blend-in command is determined by U13 (pins 1 to 6), U15 and U16 (pins 1 to 6). This command is mixed with the line switching command by means of an over-riding clear operation in U33 (pin 3).

GENERATING THE INCREMENTS (D)

The quantity designated D is generated by the Incrementor Controller. FIG. 6.

During the initial stage of the picture acquisition process (outer convergence) the magnitude of D is halved after each frame period commencing with a value equal to half the dynamic range of L (i.e. by stepping down the value of D by one bit level after each frame period). This process is allowed to continue until the value of D is comparable with the value $$\sqrt{\frac{2}{\pi}} \times (\text{RMS input noise voltage}).$$

At this point (say $D = Do$) the rate of halving of the value D will be reduced in such a way as to give the following approximation to a hyperbolic function of time:

| VALUE OF D | DURATION (NO. OF FRAMES) |
|---|---|
| Do | 1 |
| Do/2 | 2 |
| Do/4 | 4 |
| Do/8 | 8 |
| $Do/2^N$ | $2^N$ |

The transition point between the "outer" and "inner" convergence processes is preset (on the front panel of the instrument) by a prior knowledge of the input noise level. Convergence is complete after the value of D has been held at one least significant bit (of M) for a sufficiently long period for the residual noise level to assymptote to its final value.

With reference to the circuit diagram of the incrementor controller (FIG. 6) 11 to 1 are the bits constituting the value D.

Each bit is generated at one output of a chain of D type flip-flops (U13, U14) which forms a 12 stage shift register. Prior to the commencement of a convergence cycle all shift register outputs are set to zero by means of a reset command on pin 1 of U13 and U14 ("step size" selector on "Auto"). Thus the initial value of D is 011111111111. Let us assume for the moment that a high logic level (corresponding to the 12 bit ripple counter (U10) set to all zeros) at pin 12 of U12 allows a frame rate pulse to drive the shift register (U13, U14) via the clock inputs (pin 1). On initiation of a convergence cycle the reset command is removed from the shift register and the high logic level on the input stage (pin 11, U13) is allowed to propagate through the register. The sequence of D values generated in this way may be tabulated thus:

| TIME | | | | | D VALUE | | | | | | | | |
|---|---|---|---|---|---|---|---|---|---|---|---|---|---|
| | $\Delta_{12}$ | $\Delta_{11}$ | $\Delta_{10}$ | $\Delta_9$ | $\Delta_8$ | $\Delta_7$ | $\Delta_6$ | $\Delta_5$ | $\Delta_4$ | $\Delta_3$ | $\Delta_2$ | $\Delta_1$ | Most significant bit |
| 1st Frame | 0 | 1 | 1 | 1 | 1 | 1 | 1 | 1 | 1 | 1 | 1 | 1 | |
| 2nd Frame | 0 | 0 | 1 | 1 | 1 | 1 | 1 | 1 | 1 | 1 | 1 | 1 | |
| 3rd Frame | 0 | 0 | 0 | 1 | 1 | 1 | 1 | 1 | 1 | 1 | 1 | 1 | |
| 4th Frame | 0 | 0 | 0 | 0 | 1 | 1 | 1 | 1 | 1 | 1 | 1 | 1 | |
| 5th Frame | 0 | 0 | 0 | 0 | 0 | 1 | 1 | 1 | 1 | 1 | 1 | 1 | |
| 6th Frame | 0 | 0 | 0 | 0 | 0 | 0 | 1 | 1 | 1 | 1 | 1 | 1 | |
| 7th Frame | 0 | 0 | 0 | 0 | 0 | 0 | 0 | 1 | 1 | 1 | 1 | 1 | |
| 8th Frame | 0 | 0 | 0 | 0 | 0 | 0 | 0 | 0 | 1 | 1 | 1 | 1 | |
| 9th Frame | 0 | 0 | 0 | 0 | 0 | 0 | 0 | 0 | 0 | 1 | 1 | 1 | |
| 10th Frame | 0 | 0 | 0 | 0 | 0 | 0 | 0 | 0 | 0 | 0 | 1 | 1 | |
| 11th Frame | 0 | 0 | 0 | 0 | 0 | 0 | 0 | 0 | 0 | 0 | 0 | 1 | Least significant bit |

This sequence will generate a purely "outer" convergence cycle with a convergence time equal to 11/25 Th of a second and is obtained with the input signal-to-noise ratio selector on the 2nd lowest setting.

With the input signal-to-noise ratio selector switch set for higher input noise levels the above sequence is modified below the appropriate bit level by a progressive reduction in the number of clock pulses allowed to reach the shift register via the gate U12 (pins 11, 12, 13). This progressive reduction is defined by the counter U10 and the combinational network U1 to U9. For example with the input signal-to-noise ratio selector on pin 7 of U13 the following sequence of D values is obtained:

| TIME | D VALUE | | | | | | | | | | | | |
|---|---|---|---|---|---|---|---|---|---|---|---|---|---|
| 1st Frame | 0 | 1 | 1 | 1 | 1 | 1 | 1 | 1 | 1 | 1 | 1 | 1 | |
| 2nd Frame | 0 | 0 | 1 | 1 | 1 | 1 | 1 | 1 | 1 | 1 | 1 | 1 | |
| 3rd Frame | 0 | 0 | 0 | 1 | 1 | 1 | 1 | 1 | 1 | 1 | 1 | 1 | OUTER |
| 4th Frame | 0 | 0 | 0 | 0 | 1 | 1 | 1 | 1 | 1 | 1 | 1 | 1 | CONVERGENCE |
| 5th Frame | 0 | 0 | 0 | 0 | 0 | 1 | 1 | 1 | 1 | 1 | 1 | 1 | |
| 6th Frame | 0 | 0 | 0 | 0 | 0 | 0 | 1 | 1 | 1 | 1 | 1 | 1 | |
| 7th Frame | 0 | 0 | 0 | 0 | 0 | 0 | 0 | 1 | 1 | 1 | 1 | 1 | |
| 8th Frame | 0 | 0 | 0 | 0 | 0 | 0 | 0 | 1 | 1 | 1 | 1 | 1 | |
| 9th Frame to | 0 | 0 | 0 | 0 | 0 | 0 | 0 | 0 | 1 | 1 | 1 | 1 | |
| 12th Frame | 0 | 0 | 0 | 0 | 0 | 0 | 0 | 0 | 1 | 1 | 1 | 1 | INNER |
| 13th Frame to | 0 | 0 | 0 | 0 | 0 | 0 | 0 | 0 | 0 | 1 | 1 | 1 | CONVERGENCE |
| 20th Frame | 0 | 0 | 0 | 0 | 0 | 0 | 0 | 0 | 0 | 1 | 1 | 1 | |
| 21st Frame to | 0 | 0 | 0 | 0 | 0 | 0 | 0 | 0 | 0 | 0 | 1 | 1 | |
| 36th Frame | 0 | 0 | 0 | 0 | 0 | 0 | 0 | 0 | 0 | 0 | 1 | 1 | |
| 37th Frame to | 0 | 0 | 0 | 0 | 0 | 0 | 0 | 0 | 0 | 0 | 0 | 1 | |
| End of Convergence | 0 | 0 | 0 | 0 | 0 | 0 | 0 | 0 | 0 | 0 | 0 | 1 | |

The above algorithm may be overidden by means of the step size selector which provides a means of manual step size selection. U11 and U18 serve to synchronise all command transitions to the T.V. frame pulse to ensure that all processing occurs for an integral number of frames.

I claim:

1. A signal-to-noise improving system comprising, a circuit input for incoming noisy analogue signals and a circuit input for digitally stored input signals which have an improved signal-to-noise ratio provided by the system and which have been converted to analogue form, said circuit input and said circuit output being connected to inputs of an analogue comparator arranged to give an output signal which signifies that the analogue form of the digitally stored input signal is either higher or lower in magnitude than the incoming noisy analogue signal or that the incoming noisy analogue signal is either higher or lower in magnitude than the analogue form of the digitally stored input signal, said comparator output signal being connected to a signal incrementor to give a signal output which is the digitally stored input signal incremented higher or lower by a number digitally in response to either a higher or lower signal output from said comparator, said incrementor including a controller for controlling the incrementation of said incrementor according to a predetermined sequence based on a prior knowledge of the input noise level such that upon commencement of said incrementation, the magnitude of incrementation will be approximately equal to $\sqrt{2}/\pi$ times the root mean square of the input noise level and said magnitude of incrementation will be divided by two for each $2^N$ incrementations of a digitally stored input signal where N=0, 1, 2, 3, 4, 5, ..., a store for storing in digital form the so incremented digitally stored input signals, the store output being connected to a digital-to-analogue converter the output of which is connected to said circuit output, said comparator, said incrementor, said store and said digital-to-analogue converter being operative cyclically to compare the incoming noisy analogue signals with the analogue form of the digitally stored input signals and to update the digitally stored input signals by adding or subtracting a number digitally from the digitally stored input signals in accordance with the output signal of said comparator whereby to eventually store signals representative of the incoming signals with enhanced signal-to-noise ratio so that said circuit output can provide an output signal of those enhanced digitally stored input signals.

2. A system as claimed in claim 1 wherein said incrementor controller has an earlier stage of controlling which initially increments said incrementor in a series of increments the magnitudes of which are divided by two between consecutive incrementations of a digitally stored input signal, said earlier stage of controlling reducing the magnitude of incrementation until it is approximately equal to $\sqrt{2}/\pi$ times the root mean square of the input noise level whereby to provide for rapid early convergence to a digitally stored input signal value near the mean value of the incoming noisy analogue signal.

3. A system as claimed in claim 2 which is applied to a frame of a video picture image which comprises a plurality of picture element signals and wherein the system components are of a size to process digitally each of said picture element signals and wherein said incrementor assigns each of said picture element signals a respective N-bit digital word in said store.

4. A signal-to-noise improving system comprising, a circuit input for incoming noisy analogue signals which represent a frame of a video picture image having a plurality of picture element signals and a circuit output for digitally stored input signals which have an improved signal-to-noise ratio provided by the system and which have been converted to analogue form, said circuit input and said circuit output being connected to inputs of an analogue comparator arranged to give an output signal which signifies that the analogue form of the digitally stored input signal is either higher or lower in magnitude than the incoming noisy analogue signal or that the incoming noisy analogue signal is either higher or lower in magnitude than the analogue form of the digitally stored input signal, said comparator output being connected to a signal incrementor to give a signal output which is the digitally stored input signal incremented higher or lower by a number digitally in response to either a higher or lower signal output from said comparator, said incrementor including a controller for controlling the incrementation of said incrementor according to a predetermined sequence based on a prior knowledge of the input noise level such that during incrementation the magnitude of incrementation is initially divided by two between consecutive incrementations of a digitally stored input signal until the magnitude of incrementation is approximately equal to $\sqrt{2/\pi}$ times the root mean square of the input noise level and thereafter the magnitude of incrementation will be divided by two for each $2^N$ incrementations of a digitally stored input signal where $N=0, 1, 2, 3, 4, 5, \ldots,$ a store for storing in digital form the so incremented digitally stored input signals, the store output being connected to a digital-to-analogue converter the output of which is connected to said circuit output, said comparator, said incrementor, said store and said digital-to-analogue converter being operative cyclically to compare the incoming noisy analogue signals with the analogue form of the digitally stored input signals and to update the digitally stored input signals by adding or subtracting a number digitally from the digitally stored input signals in accordance with the output signal of said comparator whereby to eventually store signals representative of the incoming signals with enhanced signal-to-noise ratio so that said circuit output can provide an output signal of those enhanced stored signals and wherein the system components are of a size to process digitally each of said plurality of picture element signals in a frame of a video picture image and wherein each of said picture element signals is assigned a respective N-bit digital word in said store by said incrementor, the digital number of the N-bit word being greater than the gray-scale resolution of each picture element of the frame and also greater than the resolution of said digital-to-analogue converter.

5. The signal-to-noise improving system of claim 4 wherein each of the picture elements is incremented by said incrementor by the same incremental amount during a given frame.

* * * * *

UNITED STATES PATENT AND TRADEMARK OFFICE
CERTIFICATE OF CORRECTION

PATENT NO. : 4,392,123
DATED : July 5, 1983
INVENTOR(S) : Harro Bruggemann

It is certified that error appears in the above-identified patent and that said Letters Patent is hereby corrected as shown below:

Column 1, line 66, "per" should read -- (per --.

Column 2, line 21, "." should read -- , --.

Column 5, lines 40-45, "$T_{TOTAL} \approx T_{INNER}$" should read -- $T_{total} \approx T_{inner}$ --.

Column 6, lines 5-9, "$\rho = \int_{-\infty}^{m\Delta} \frac{e^{-\frac{x^2}{2V_{in}^2}}}{\sqrt{2\pi}\, V_{in}} dx$" should read -- $\rho = \int_{-\infty}^{m\Delta} \frac{e^{-\frac{x^2}{2V_{in}^2}}}{\sqrt{2\pi}\, V_{in}} dx$ --.

Column 6, lines 11-14, " $= 1 - \rho$" should read -- $q = 1 - \rho$ --.

UNITED STATES PATENT AND TRADEMARK OFFICE
CERTIFICATE OF CORRECTION

PATENT NO. : 4,392,123

DATED : July 5, 1983

INVENTOR(S) : Harro Bruggemann

It is certified that error appears in the above-identified patent and that said Letters Patent is hereby corrected as shown below:

Column 6, line 27, "and  ." should read -- and q. --.

Column 6, lines 58-63, " $= \frac{1}{2} \left( 1 + \frac{2m\Delta}{\sqrt{2\pi} \, V_{in}} \right)$ " should read -- $q = \frac{1}{2} \left( 1 + \frac{2m\Delta}{\sqrt{2\pi} \, V_{in}} \right)$ --.

Column 7, lines 15-20,

" $\rho_2 (s\Delta/\eta\Delta;\eta\tau) = \frac{(-1)^{R-S}}{2^{2R}} \sum_{J=-R}^{R} \left(\frac{j}{R}\right)^n C_{R+J}^{(1-5)} C_{R+m}^{(j)}$ " should read -- $\rho_2 (s\Delta/m\Delta;n\tau) = \frac{(-1)^{R+S}}{2^{2R}} \sum_{J=-R}^{R} \left(\frac{j}{R}\right)^n C_{R+j}^{(1-s)} C_{R+m}^{(j)}$ --.

UNITED STATES PATENT AND TRADEMARK OFFICE
CERTIFICATE OF CORRECTION

PATENT NO. : 4,392,123

DATED : July 5, 1983

INVENTOR(S) : Harro Bruggemann

It is certified that error appears in the above-identified patent and that said Letters Patent is hereby corrected as shown below:

Column 7, lines 38-42, "$W_2(V_0/V;t) = \dfrac{e^{-\frac{(V \cdot V)^2}{\sqrt{2\pi}\,\sigma}}}{\sqrt{2\pi}\,\sigma}$"

should read -- $W_2(V_0/V;t) = \dfrac{e^{-\frac{(V \cdot \hat{V})^2}{\sqrt{2\pi}\,\sigma}}}{\sqrt{2\pi}\,\sigma}$ --.

Column 7, line 44, "$V = V_0 e^{-\gamma t}$" should read -- $\hat{V} = V_0 e^{-\gamma t}$ --.

Column 8, line 9, "$\overline{f(t_1)F(t_2)}$" should read -- $\overline{f(t_1)f(t_2)}$ --.

Column 8, line 15, "$\rho(t) = \dfrac{V^2_{out}(t)}{V_{in}}$" should read -- $\rho(t) = \dfrac{V^2_{out}(t)}{V^2_{in}}$ --.

UNITED STATES PATENT AND TRADEMARK OFFICE
CERTIFICATE OF CORRECTION

PATENT NO. : 4,392,123

DATED : July 5, 1983

INVENTOR(S) : Harro Bruggemann

It is certified that error appears in the above-identified patent and that said Letters Patent is hereby corrected as shown below:

Column 8, line 25, "$\left(\frac{1}{2}\gamma\right)$" should read -- $\left(\frac{1}{2\gamma}\right)$ --.

Column 9, lines 42-43, "$\rho_{opt}(n) = \frac{1}{1 + \frac{2n}{\pi}} \approx \frac{\pi}{2n}$ for $n \gg 1$" should read -- $\rho_{opt}(n) = \frac{1}{1 + \frac{2n}{\pi}} \approx \frac{\pi}{2n}$ for $n \gg 1$ --.

Column 9, lines 49-51, "$\sqrt{\frac{2}{\pi}} \sqrt{n} \approx 0.8\sqrt{n}$" should read -- $\sqrt{\frac{2}{\pi}} \sqrt{n} \approx 0.8\sqrt{n}$ --.

Column 9, line 58, "$\sqrt{n}$" should read -- $\sqrt{n}$ --.

Column 10, line 8, "initiaally" should read -- initially --.

UNITED STATES PATENT AND TRADEMARK OFFICE
CERTIFICATE OF CORRECTION

PATENT NO. : 4,392,123

DATED : July 5, 1983

INVENTOR(S) : Harro Bruggemann

It is certified that error appears in the above-identified patent and that said Letters Patent is hereby corrected as shown below:

Column 10, line 18, "η break pt." should read -- n break pt. --.

Column 11, lines 3-5

"$\Delta_{opt}(\eta) = \frac{\rho}{2K_1} = \frac{\sqrt{\frac{2}{\pi}} V_{in}}{1 + \frac{2\eta}{\pi}} \approx \sqrt{\frac{\pi}{2}} \frac{V_{in}}{\eta}$ for $\eta \gg 1$" should read -- $\Delta_{opt}(n) = \frac{\rho}{2K_1} = \frac{\sqrt{\frac{2}{\pi}} V_{in}}{1 + \frac{2n}{\pi}} \approx \sqrt{\frac{\pi}{2}} \frac{V_{in}}{n}$ for $n \gg 1$ --.

Column 11, line 18, "sequence $\Delta_{opt}(n)$" should read -- sequence $\overline{\Delta}_{opt}(n)$ --.

Column 13, line 62, "(BB)/B" should read -- BB/B --.

Column 13, line 63, "(BB)/A" should read -- BB/A --.

UNITED STATES PATENT AND TRADEMARK OFFICE
CERTIFICATE OF CORRECTION

PATENT NO. : 4,392,123

DATED : July 5, 1983

INVENTOR(S) : Harro Bruggemann

It is certified that error appears in the above-identified patent and that said Letters Patent is hereby corrected as shown below:

Column 15, line 49, "$D_{opt}$" should read -- $\overline{D}_{opt}$ --.

Column 16, lines 15-16, "PCB;3s" should read -- PCB's --.

Column 17, line 2, "diaplay" should read -- display --.

Column 19, line 31 (claim 1, line 3), "input for digitally" should read -- output for digitally --.

UNITED STATES PATENT AND TRADEMARK OFFICE
CERTIFICATE OF CORRECTION

PATENT NO. : 4,392,123

DATED : July 5, 1983

INVENTOR(S) : Harro Bruggemann

It is certified that error appears in the above-identified patent and that said Letters Patent is hereby corrected as shown below:

Column 1, line 33, "$\sqrt{2A} - 1$" should read -- $\sqrt{2A-1}$ --

Column 1, line 64 "$\sqrt{2/\pi}\sqrt{n}$" should read -- $\sqrt{2/\pi}\sqrt{\eta}$ --

Column 2, line 62 "$\sqrt{2/\pi}$" should read -- $\sqrt{2/\pi}$ --

Column 2, line 63, "$\sqrt{2/\pi}/A$ where" should read -- $\sqrt{2/\pi}/A$ where --

Column 19, line 55, "$\sqrt{2/\pi}$" should read -- $\sqrt{2/\pi}$ --

Column 20, line 38, "$\sqrt{2/\pi}$" should read -- $\sqrt{2/\pi}$ --

Column 21, line 11, "$\sqrt{2/\pi}$" should read -- $\sqrt{2/\pi}$ --

Signed and Sealed this

Thirty-first Day of July 1984

[SEAL]

Attest:

GERALD J. MOSSINGHOFF

Attesting Officer     Commissioner of Patents and Trademarks